US012719934B2

(12) United States Patent
Zhou et al.

(10) Patent No.: US 12,719,934 B2
(45) Date of Patent: Aug. 25, 2026

(54) INFORMATION IDENTIFICATION-BASED POWER INTERNET OF THINGS PROTECTION METHOD AND APPARATUS, AND INTERNET OF THINGS SYSTEM

(71) Applicant: Zhongshan Power Supply Bureau of Guangdong Power Grid Co Ltd., Zhongshan City (CN)

(72) Inventors: Xiangfeng Zhou, Zhongshan City (CN); Chunyuan Cai, Zhongshan City (CN); Yongjian Li, Zhongshan City (CN); Lifei Li, Zhongshan City (CN); Weixia Jian, Zhongshan City (CN); Yanhe Yin, Zhongshan City (CN); Lei Liu, Zhongshan City (CN); An Chen, Zhongshan City (CN); Zhenjiang Chen, Zhongshan City (CN); Hua Li, Zhongshan City (CN); Huibin Zhou, Zhongshan City (CN); Ying Zhang, Zhongshan City (CN); Shaoyan Jiang, Zhongshan City (CN)

(73) Assignee: ZHONGSHAN POWER SUPPLY BUREAU OF GUANGDONG POWER GRID CO LTD., Zhongshan City (CN)

( * ) Notice: Subject to any disclaimer, the term of this patent is extended or adjusted under 35 U.S.C. 154(b) by 107 days.

(21) Appl. No.: 18/902,261

(22) Filed: Sep. 30, 2024

(65) Prior Publication Data

US 2025/0379891 A1 Dec. 11, 2025

(30) Foreign Application Priority Data

Jun. 5, 2024 (CN) ........................ 202410721555.9

(51) Int. Cl.
*H04L 9/40* (2022.01)

(52) U.S. Cl.
CPC ........... *H04L 63/20* (2013.01); *H04L 63/107* (2013.01); *H04L 63/1433* (2013.01)

(58) Field of Classification Search
CPC ... H04L 63/20; H04L 63/107; H04L 63/1433; H04L 41/142; H04L 67/12; H04L 9/40
See application file for complete search history.

(56) References Cited

U.S. PATENT DOCUMENTS

2014/0079297 A1* 3/2014 Tadayon .............. G06V 40/172 382/118
2025/0323663 A1* 10/2025 Li ...................... H03M 7/3059

FOREIGN PATENT DOCUMENTS

CN 117793008 A 3/2024
CN 117812020 A 4/2024
CN 118041571 A 5/2024

OTHER PUBLICATIONS

Chinese Search Report dated Aug. 15, 2024 issued in CN application No. 202410721555.9.

* cited by examiner

*Primary Examiner* — Quazi Farooqui
(74) *Attorney, Agent, or Firm* — Scully, Scott, Murphy & Presser, P.C.

(57) ABSTRACT

The present disclosure provides an information identification-based power Internet of Things protection method, and the method includes that: the safety identification errors of a source network, a channel network and a storage network of a system and the safety identification errors of a place name, a user and a node corresponding to each network are respectively determined by using a statistical analysis method; an information loss value and an information gain value are calculated according to the safety identification errors, the trust degree is calculated according to the information loss value and the information gain value, and a (Continued)

target function is obtained by maximizing the credibility and minimizing the safety identification error to obtain target control input by using a baseline learning machine method, so that the electric power Internet of Things system is controlled according to the target control input.

9 Claims, 3 Drawing Sheets

INFORMATION IDENTIFICATION-BASED POWER INTERNET OF THINGS PROTECTION METHOD AND APPARATUS, AND INTERNET OF THINGS SYSTEM

CROSS-REFERENCE TO RELATED APPLICATIONS

The present disclosure claims priority of Chinese Patent Application No. 202410721555.9, filed to China Patent Office on Jun. 5, 2024 and named after "Information Identification-Based Power Internet of Things Protection Method and Apparatus, and Internet of Things System". Contents of the present disclosure are hereby incorporated by reference in entirety of the Chinese Patent Application.

TECHNICAL FIELD

The present disclosure relates to the technical field of power systems and automation thereof, and in particular to an information identification-based power Internet of Things protection method, an apparatus, a non-transitory storage medium, and an electric power Internet of Things system.

BACKGROUND

Objects are connected with a network through the Internet of Things. Related information of the objects is collected at any time by using technologies such as a sensor, so as to track, locate and manage the objects. With the widespread use of technologies such as cloud computing and big data, it has become increasingly important to quickly, in real-time, effectively search the related information of the objects in the real world in production and life, and efficiently organize and manage the related information, such as searching for location information of a current express, searching for the best route from a school to a room, etc. Therefore, the Internet of Things search technology emerges. The Internet of Things search technology also has a serious data security privacy problem while bringing convenience. An Internet of Things device usually collects information of the objects, and stores, analyzes and manages the information of the objects in daily life, so as to provide various search services for a user and return information for meeting a search request. However, if the Internet of Things device is maliciously attacked and utilized by an attacker, it is likely to result in leakage of private data.

Therefore, an information identification-based power Internet of Things security protection method has not been provided in the related art.

SUMMARY

At least some embodiments of the present disclosure provide an information identification-based power Internet of Things protection method, an apparatus, a non-transitory storage medium, and an electric power Internet of Things system, so as to at least solve the problem in the related art that the information identification-based power Internet of Things security protection method has not been provided yet.

In some embodiments of the present disclosure, an information identification-based power Internet of Things protection method is provided, including that:

security identification is performed on a data source of power Internet of Things to determine a security identification error of the data source, security identification is performed on a data channel of the power Internet of Things to determine a security identification error of the data channel, and security identification is performed on data storage of the power Internet of Things to determine a security identification error of the data storage; multiple fuzzy-uncertainty three-dimensional trapezoidal fuzzy sets with different levels of data transmission rates is calculated by using a statistical analysis method according to the data transmission rates of a monitoring data center of the power Internet of Things, multiple fuzzy-uncertainty three-dimensional trapezoidal fuzzy sets with different levels of data storage sharing scales is calculated by using the statistical analysis method according to the data storage sharing scales of the data monitoring center of the power Internet of Things, an information gain value is calculated according to the multiple three-dimensional trapezoidal fuzzy sets with different levels of data transmission rates and the multiple the three-dimensional trapezoidal fuzzy sets with different levels of data storage sharing scales, an information loss value is calculated according to the security identification error of the data source, the security identification error of the data channel, and the security identification error of the data storage, and a trust degree is calculated according to the information gain value and the information loss value; an objective function is constructed according to the trust degree, where the objective function is used for solving to obtain a control input in response to obtaining a minimum value of the security identification error of the data source, a minimum value of the security identification error of the data channel, and a minimum value of the security identification error of the data storage, and obtaining a maximum value of the trust degree; and the objective function is solved according to an extreme learning machine method to obtain a target control input, and a power Internet of Things system is controlled according to the target control input.

Optionally, an operation of performing security identification on the data source of the power Internet of Things to determine the security identification error of the data source includes that:

a data source network of the power Internet of Things and location data information of the data source network, user data information of the data source network and node data information of the data source network are collected by using an Internet of Things sensing system, and a data information identification error of the data source network, a data information identification error of the location data information of the data source network, a data information identification error of the user data information of the data source network and a data information identification error of the node data information of the data source network are determined respectively by using the statistical analysis method; and the security identification error of the data source is calculated according to the data information identification error of the data source network, the data information identification error of the location data information of the data source network, the data information identification error of the user data information of the data source network and the data information identification error of the node data information of the data source network:

$$e_F = e_G^F + e_G^F + e_U^F + e_N^F;$$

where $e_F$ is the security identification error of the data source, $$e_G^F$$

is the data information identification error of the data source network, $$e_P^F$$

is the data information identification error of the location data information of the data source network, $$e_U^F$$

is the data information identification error of the user data information of the data source network, and $$e_N^F$$

is the data information identification error of the node data information of the data source network.

Optionally, an operation of performing security identification on the data channel of the power Internet of Things to determine the security identification error of the data channel includes:

a data channel network of the power Internet of Things and location data information of the data channel network, user data information of the data channel network and node data information of the data channel network are collecting by using the Internet of Things sensing system, and a data information identification error of the data channel network, a data information identification error of the location data information of the data channel network, a data information identification error of the user data information of the data channel network and a data information identification error of the node data information of the data channel network respectively are determined by using the statistical analysis method; and the security identification error of the data channel is calculated according to the data information identification error of the data channel network, the data information identification error of the location data information of the data channel network, the data information identification error of the user data information of the data channel network and the data information identification error of the node data information of the data channel network:

$$e_X = e_G^X + e_P^X + e_U^X + e_N^X;$$

where $e_X$ is the security identification error of the data channel, $$e_G^X$$

is the data information identification error of the data channel network, $$e_P^X$$

is the data information identification error of the location data information of the data channel network, $$e_U^X$$

is the data information identification error of the user data information of the data channel network, and $$e_N^X$$

is the data information identification error of the node data information of the data channel network.

Optionally, an operation of performing security identification on the data storage of the power Internet of Things to determine the security identification error of the data storage includes that:

a data storage network of the power Internet of Things and location data information of the data storage network, user data information of the data storage network and node data information of the data storage network are collected by using the Internet of Things sensing system, and a data information identification error of the data storage network, a data information identification error of the location data information of the data storage network, a data information identification error of the user data information of the data storage network and a data information identification error of the node data information of the data storage network are determined respectively by using the statistical analysis method; and the security identification error of the data storage is calculated according to the data information identification error of the data storage network, the data information identification error of the location data information of the data storage network, the data information identification error of the user data information of the data storage network and the data information identification error of the node data information of the data storage network:

$$e_S = e_G^S + e_P^S + e_U^S + e_N^S;$$

where $e_S$ is the security identification error of the data storage, $$e_G^S$$

is the data information identification error of the data storage network, $$e_P^S$$

is the data information identification error of the location data information of the data storage network, $$e_U^S$$

is the data information identification error of the user data information of the data storage network, and $$e_N^S$$

is the data information identification error of the node data information of the data storage network.

Optionally, an operation of calculating the information gain value according to the multiple three-dimensional trapezoidal fuzzy sets with different levels of data transmission rates and the multiple the three-dimensional trapezoidal fuzzy sets with different levels of data storage sharing scales, and calculating the information loss value according to the security identification error of the data source, the security identification error of the data channel, and the security identification error of the data storage, and calculating the trust degree according to the information gain value and the information loss value, includes that:

the multiple three-dimensional trapezoidal fuzzy sets with different levels of data transmission rates and the multiple three-dimensional trapezoidal fuzzy sets with different levels of data storage sharing scales are substituted into a calculation formula of the information gain value to calculate the information gain value R corresponding to the multiple three-dimensional trapezoidal fuzzy sets with different levels of data transmission rates and the multiple three-dimensional trapezoidal fuzzy sets with different levels of data storage sharing scales:

$$R = E\left[\vee_{i=1}^{9} k_{Dvi} v_{Di} \otimes \vee_{i=1}^{9} k_{DSi} S_{Di} \otimes k_{Mi} M_H\right];$$

where R is an information gain value formed by the power Internet of Things providing data collection, transmission, storage and sharing for an accessing user, $$\vee_{i=1}^{9} k_{Dvi} v_{Di}$$

is an information gain value in cases where the fuzzy-uncertainty three-dimensional trapezoidal fuzzy sets of the data transmission rates are at different levels when the power Internet of Things provides a service to the accessing user, $k_{Dvi}$ is a unit gain value in cases where the power Internet of Things provides a fuzzy-uncertainty three-dimensional trapezoidal fuzzy set of an $i^{th}$ data transmission rate, $$\vee_{i=1}^{9} k_{DSi} S_{Di}$$

is an information gain value in cases where the fuzzy-uncertainty three-dimensional trapezoidal fuzzy sets of the data storage scales are at different levels when the power Internet of Things provides the service to the accessing user, $k_{DSi}$ is a unit gain value in cases where the power Internet of Things provides a fuzzy-uncertainty three-dimensional trapezoidal fuzzy set of an $i^{th}$ data storage sharing scale, $k_{Mi}M_H$ is an information gain value when the power Internet of Things provides a data collection service for the accessing user at a sensing layer, $k_{Mi}$ is a unit gain value when the power Internet of Things provides the data collection service for the accessing user at the sensing layer, E[ ] is to obtain a desired value for [ ], and $$\vee_{i=1}^{9}$$

represents a union set of nine fuzzy sets;

the security identification error of the data source, the security identification error of the data channel and the security identification error of the data storage are substituted into a calculation formula of the information loss value to calculate the information loss value L of the security identification error of the data source, the security identification error of the data channel and the security identification error of the data storage:

$$L = k_1^F k_2^F e_F + k_1^X k_2^X e_X + k_1^S k_2^S e_S;$$

where L is an information loss value of market trading caused by the security identification error of the data source, the security identification error of the data channel and the security identification error of the data storage formed in the power Internet of Things;

$$k_1^F$$

is an influence coefficient or weight coefficient of the security identification error of the data source on power data distribution, $$k_2^F$$

is a unit power information loss value caused by the security identification error of the data source;

$$k_1^X$$

is an influence coefficient or weight coefficient of the security identification error of the data channel on the power data distribution, $$k_2^X$$

is a unit power information loss value caused by the security identification error of the data channel;

$$k_1^S$$

is an influence coefficient or weight coefficient of the security identification error of the data storage on the power data distribution, $$k_2^S$$

is a unit power information loss value caused by the security identification error of the data storage; and the information gain value and the information loss value is substituted into a calculation formula of the trust degree to calculate the trust degree B:

$$B = \frac{R}{R+L}.$$

Optionally, an operation of constructing the objective function according to the trust degree includes that:

the objective function is constructed according to the trust degree, where the objective function satisfies a first condition, a second condition, a third condition, a fourth condition, a fifth condition, a sixth condition, a seventh condition, and an eighth condition:

$$\max B;$$

$$\min(e_F + e_X + e_S);$$

where the first condition is $\underline{V}_{Vi} \leq V_{Vi} \leq \overline{V}_{Vi}$, in which $V_{Vi}$ is an actual signal traffic of an $i^{th}$ user, $\overline{V}_{Vi}$ is an allowable maximum value of the signal traffic of the $i^{th}$ user, and $\underline{V}_{Vi}$ is an allowable minimum value of the signal traffic of the $i^{th}$ user; the second condition is $\underline{v}_{Vi} \leq v_{Vi}$, in which $v_{Vi}$ is an actual signal transmission speed of the $i^{th}$ user, and $\underline{v}_{Vi}$ is an allowable minimum value of the signal transmission speed of the $i^{th}$ user; the third condition is $\underline{v}_{Xi} \leq v_{Xi} \leq \overline{v}_{Xi}$, in which $v_{Xi}$ is an actual transmission speed of an $i^{th}$ channel, $\overline{v}_{Xi}$ is an allowable maximum value of the transmission speed of the $i^{th}$ channel, and $\underline{v}_{Xi}$ is an allowable minimum value of the transmission speed of the $i^{th}$ channel; the fourth condition is $\underline{k}_{QoS} \leq k_{QoS} \leq \overline{k}_{QoS}$, in which $k_{QoS}$ is an actual network quality of service, $\overline{k}_{QoS}$ is an allowable maximum value of the network quality of service, and $\underline{k}_{QoS}$ is an allowable minimum value of the network quality of service; the fifth condition is $\underline{t}_{Xi} \leq t_{Xi} \leq \overline{t}_{Xi}$, in which $t_{Xi}$ is an actual signal transmission delay of the $i^{th}$ channel, $\underline{t}_{Xi}$ is an allowable maximum value of the signal transmission delay of the $i^{th}$ channel, and $\underline{t}_{Xi}$ is an allowable minimum value of the signal transmission delay of the $i^{th}$ channel; the sixth condition is $\underline{P}_{Ui} \leq P_{Ui} \leq \overline{P}_{Ui}$, in which $P_{Ui}$ is an actual signal power of the $i^{th}$ user, $\overline{P}_{Ui}$ is an allowable maximum value of the signal power of the $i^{th}$ user, and $\underline{P}_{Ui}$ is an allowable minimum value of the signal power of the $i^{th}$ user; and the seventh condition is $\underline{R}_i \leq R_i \leq \overline{R}_i$, in which $R_i$ is actual congestion of an $i^{th}$ node, $\overline{R}_i$ is an allowable maximum value of the congestion of the $i^{th}$ node, and $\underline{R}_i$ is an allowable minimum value of the congestion of the $i^{th}$ node.

Optionally, an operation of solving the objective function according to the extreme learning machine method to obtain the target control input includes that:

training samples, an initial residual, the maximum number of iterations and an initial Lagrange multiplier are obtained, the number of samples is determined according to the training samples, an input weight and a bias value are randomly generated, and the number of samples, the input weight, the initial residual and the initial Lagrange multiplier are inputted into a formula to calculate an output weight:

$$\beta_{k+1} = \left(H^T H + 2/R\mu I\right)^{-1} H^T\left(y - e_k + \lambda_k/\mu\right);$$

where $\beta_{k+1}$ is the output weight calculated by k iterations, H is an output matrix of a hidden layer, $H\beta=Y$, Y is an output matrix of the training samples, $\beta$ is the output weight between the hidden layer and an output layer, $e_k$ is a residual of the k iterations, R is a regular coefficient, $\lambda_k$ is the Lagrange multiplier in the k iterations, I is a unit matrix, $\mu$ is a penalty coefficient, and the penalty coefficient satisfies, $\mu=2N/\|y\|_1$, where in cases where the training samples are $(x_i, y_i) \in R^n \times R^m$, H satisfies:

$$H(w_1 \ldots w_s, x_1 \ldots x_N, b_1 \ldots b_s) = \begin{bmatrix} g(w_1 x_1 + b_1) & \ldots & g(w_s x_1 + b_s) \\ \vdots & \ldots & \vdots \\ g(w_1 x_N + b_1) & \ldots & g(w_s x_N + b_s) \end{bmatrix};$$

where w is the input weight, b is the bias value, and $g(\bullet)$ is an activation function;

the penalty coefficient is updated according to the output weight, and a model is trained according to the output weight and the updated penalty coefficient:

$$\beta_{k+1} = \left(H^T H + 2/R\mu I\right)^{-1} H^T\left(y - e_k + \lambda_k/\mu\right);$$

$$\mu = 2N/\|y\|_1 e_{k+1} = shink\left(H\beta_{k+1} + \frac{\lambda_k}{\mu}, 1/\mu\right);$$

$$\text{and } \lambda_{k+1} = \lambda_k + \mu(y - H\beta_{k+1} - e_{k+1});$$

when the number of iterations reaches the maximum number, an extreme learning machine model is constructed according to the output weight, the input weight and the bias value during the last iteration, and the target control input is solved according to the extreme learning machine model.

In some embodiments of the present disclosure, an information identification-based power Internet of Things protection apparatus is further provided, including:

a determination unit, arranged for performing security identification on a data source of power Internet of Things to determine a security identification error of the data source, performing security identification on a data channel of the power Internet of Things to determine a security identification error of the data channel, and performing security identification on data storage of the power Internet of Things to determine a security identification error of the data storage; a first calculation unit, arranged for calculating multiple fuzzy-uncertainty three-dimensional trapezoidal fuzzy sets with different levels of data transmission rates by using a statistical analysis method according to the data transmission rates of a monitoring data center of the power Internet of Things, calculating multiple fuzzy-uncertainty three-dimensional trapezoidal fuzzy sets with different levels of data storage sharing scales by using the statistical analysis method according to the data storage sharing scales of the data monitoring center of the power Internet of Things, calculating an information gain value according to the multiple three-dimensional trapezoidal fuzzy sets with different levels of data transmission rates and the multiple the three-dimensional trapezoidal fuzzy sets with different levels of data storage sharing scales, calculating an information loss value according to the security identification error of the data source, the security identification error of the data channel, and the security identification error of the data storage, and calculating a trust degree according to the information gain value and the information loss value; a construction unit, arranged for constructing an objective function according to the trust degree, where the objective function is used for solving to obtain a control input in response to obtaining a minimum value of the security identification error of the data source, a minimum value of the security identification error of the data channel, and a minimum value of the security identification error of the data storage, and obtaining a maximum value of the trust degree; and a second calculation unit, arranged for solving the objective function according to an extreme learning machine method to obtain a target control input, and controlling a power Internet of Things system according to the target control input.

In some embodiments of the present disclosure, a non-transitory storage medium is further provided, where the non-transitory storage medium includes a program, and when the program runs, a device where the non-transitory storage medium is located is controlled to execute the methods mentioned above.

In some embodiments of the present disclosure, a power Internet of Things system is further provided, including: at least one processor, a memory, and at least one program, where the at least one program is stored in the memory and arranged for being executed by the at least one processor, and the at least one program is used for executing the methods mentioned above.

Through applying the technical solution of the present disclosure, in the information identification-based power Internet of Things protection method, the security identification is performed on a data source of power Internet of Things to determine the security identification error of the data source, the security identification is performed on the data channel of the power Internet of Things to determine the security identification error of the data channel, and the security identification is performed on the data storage of the power Internet of Things to determine the security identification error of the data storage; the multiple fuzzy-uncertainty three-dimensional trapezoidal fuzzy sets with different levels of data transmission rates is calculated by using the statistical analysis method according to the data transmission rates of the monitoring data center of the power Internet of Things, the multiple fuzzy-uncertainty three-dimensional trapezoidal fuzzy sets with different levels of data storage sharing scales is calculated by using the statistical analysis method according to the data storage sharing scales of the data monitoring center of the power Internet of Things, the information gain value is calculated according to the multiple three-dimensional trapezoidal fuzzy sets with different levels of data transmission rates and the multiple the three-dimensional trapezoidal fuzzy sets with different levels of data storage sharing scales, the information loss value is calculated according to the security identification error of the data source, the security identification error of the data channel, and the security identification error of the data storage, and the trust degree is calculated according to the information gain value and the information loss value; the objective function is constructed according to the trust degree, where the objective function is used for solving to obtain the control input in response to obtaining the minimum value of the security identification error of the data source, the minimum value of the security identification error of the data channel, and the minimum value of the security identification error of the data storage, and obtaining a maximum value of the trust degree; and the objective function is solved according to the extreme learning machine method to obtain the target control input, and the power Internet of Things system is controlled according to the target control input. In some embodiments of the present disclosure the statistical analysis method is adopted to determine a data information identification error of a source network, a place name, a user and a node of the power Internet of Things, a data information identification error of a channel network, a place name, a user and a node of the power Internet of Things, and a data information identification error of a storage network, a place name, a user and a node of the power Internet of Things. The method can solve the problem in the related art that the information identification-based power Internet of Things security protection method has not been provided yet through constructing the extreme learning machine model to solve the objective function to obtain the target control input, and the objective function is set with the error minimization of the source network, the channel network and the storage network, and the trust degree maximization of a power Internet of Things user in the power Internet of Things system.

The above drawings include the following reference signs:

102, a processor; 104, a memory; 106, a transmission device; 108, an input/output device.

DETAILED DESCRIPTION

It should be noted that, in the case of no conflict, the embodiments of the present disclosure and the features of the embodiments can be combined with each other. The present disclosure will be described in detail below with reference to the accompanying drawings and in combination with the embodiments.

In order to enable those skilled person in the art to better understand the technical solution of the present disclosure, the technical solution in the embodiments of the present disclosure will be clearly and completely described below with reference to the accompanying drawings in the embodiments of the present disclosure. All other embodiments obtained by those skilled person in the art based on the embodiments of present disclosure without creative efforts shall fall within the protection scope of present disclosure.

It should be noted that the terms “first”, “second”, and the like in the specification, claims, and accompanying drawings of present disclosure are used for distinguishing similar objects, and are not necessarily used for describing a specific order or sequence. It should be understood that the data used in this way can be interchanged under appropriate circumstances so as to facilitate the embodiments of the present disclosure described herein. In addition, the terms “include” and “have” and any deformation thereof are intended to cover a non-exclusive inclusion, for example, a process, method, system, product, or device that includes a series of steps or units is not necessarily limited to those steps or units listed clearly, but can include other steps or units that are not clearly listed or inherent to these processes, methods, products, or devices.

As introduced in the background, the information identification-based power Internet of Things security protection method has not been provided yet in the related art. In order to solve the problem in the related art that the information identification-based power Internet of Things security protection method has not been provided yet, the embodiments of the present disclosure provide an information identification-based power Internet of Things protection method, an apparatus, a non-transitory storage medium, and an electric power Internet of Things system.

The technical solutions in the embodiments of the present disclosure will be clearly and completely described below with reference to the accompanying drawings in the embodiments of the present disclosure.

Figure 1:
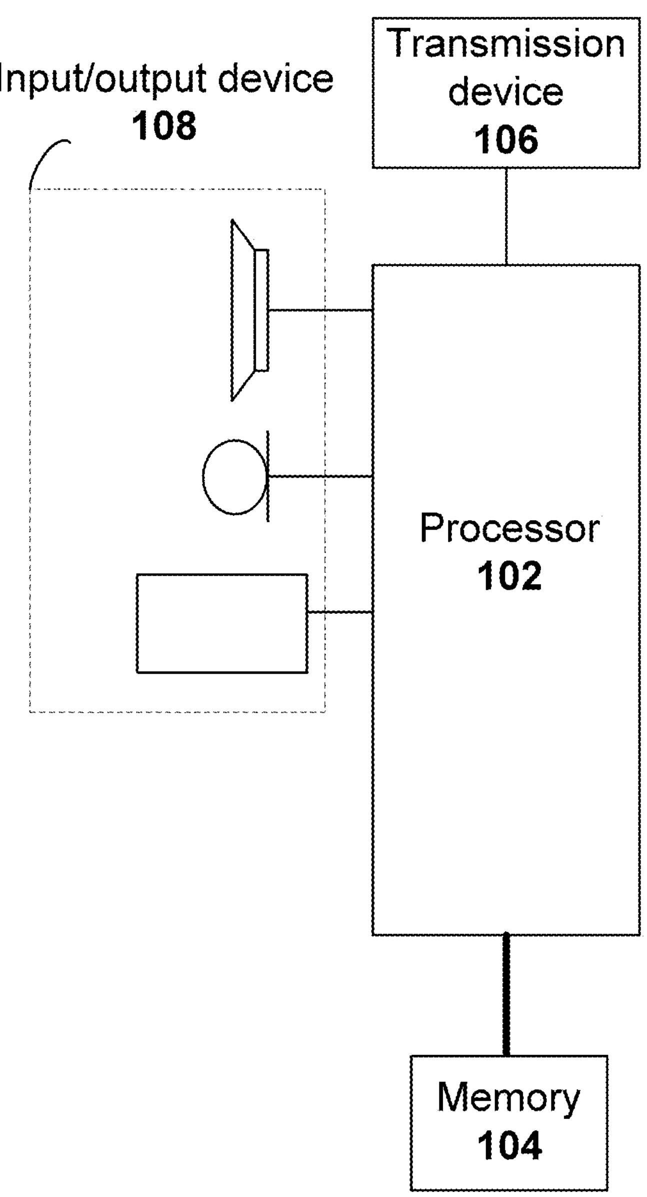
FIG. 1 is a block diagram of a hardware structure of a mobile terminal according to an information identification-based power Internet of Things protection method provided in some embodiments of the present disclosure.

The method embodiments provided in the embodiments of present disclosure can be performed in a mobile terminal, a computer terminal, or a similar computing apparatus. Taking the mobile terminal as an example, FIG. 1 is a block diagram of a hardware structure of a mobile terminal of an information identification-based power Internet of Things protection method according to some embodiments of the present invention. As shown in FIG. 1, the mobile terminal includes at least one processor 102 (one of the at least one processor is shown in FIG. 1, and the at least one processor 102 includes, but is not limited to, a processing apparatus such as a Microcontroller Unit (MCU) or a Field-Programmable Gate Array (FPGA)) and a memory 104 for storing data, where the mobile terminal further includes a transmission device 106 with a communication function and an input/output device 108. Those skilled person in the art can understand that the structure shown in FIG. 1 is an example, and does not limit the structure of the mobile terminal. For example, the mobile terminal can further include more or fewer components than those shown in FIG. 1, or have a configuration different from that shown in FIG. 1.

The memory 104 is arranged for storing a computer program, for example, a software program and a module of application software, for example, a computer program corresponding to the information identification-based power Internet of Things security protection method in the embodiments of the present disclosure, and the processor 102 executes various functional applications and data processing through running the computer program stored in the memory 104, that is, implements the method. The memory 104 includes a high-speed random access memory, and further includes a non-transitory memory, such as at least one magnetic storage apparatus, flash memory, or other non-transitory solid-state memory. In some examples, the memory 104 further includes a memory remotely arranged relative to the processor 102, and this remote memory can be connected with the mobile terminal through a network. Examples of the above network include, but are not limited to, an Internet, an intranet, a local area network, a mobile communication network, and combinations thereof. The transmission device 106 is arranged for receiving or sending data via a network. Specific examples of the above-mentioned network include a wireless network provided by a communication provider of the mobile terminal. In one example, the transmission device 106 includes a Network Interface Controller (NIC), which can be connected with other network devices through a base station to communicate with the Internet. In one example, the transmission device 106 is a Radio Frequency (RF) module, which is arranged for communicating with the Internet in a wireless manner.

In the present embodiment, an information identification-based power Internet of Things protection method running on the mobile terminal, the computer terminal or the similar computing apparatus is provided. It should be noted that the steps shown in the flowchart of the accompanying drawings can be set as a group of computer-executable instructions executed in a computer system. And although a logical order is shown in the flowchart, in some cases, the steps shown or described can be performed in an order different from that described herein.

Figure 2:
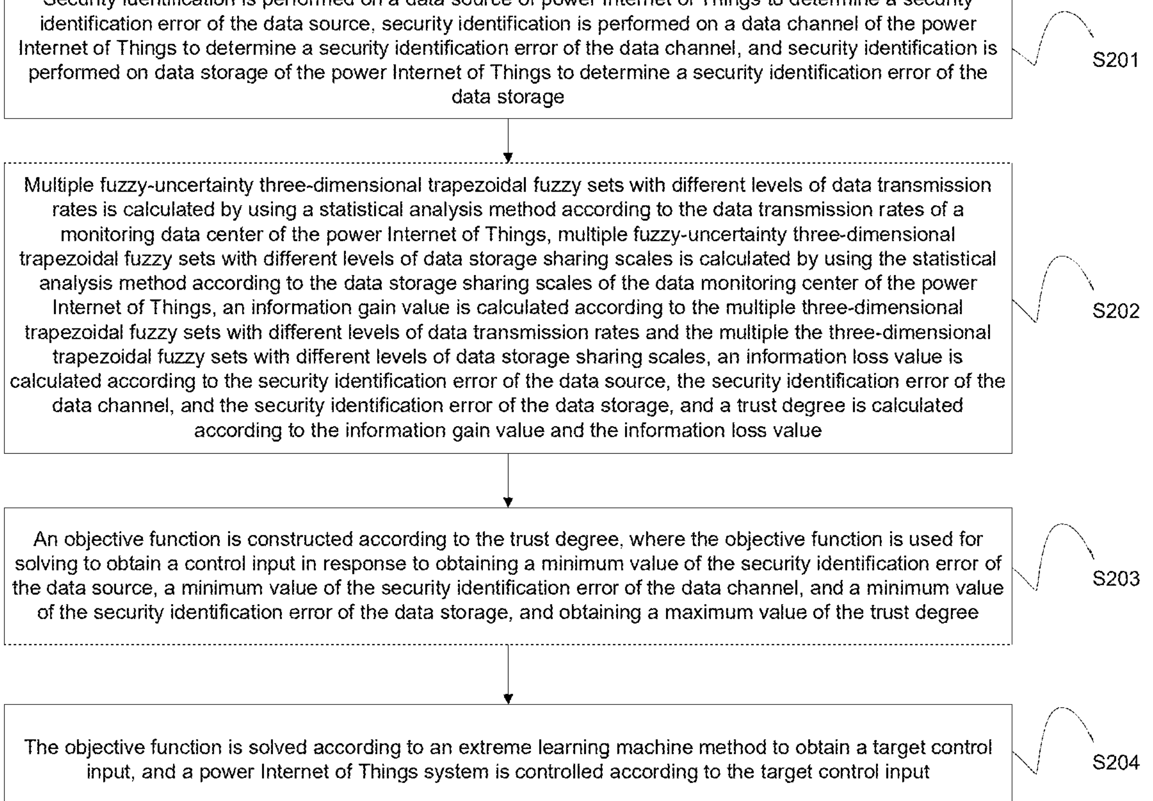
FIG. 2 is a schematic flowchart of an information identification-based power Internet of Things protection method according to some embodiments of present disclosure.

FIG. 2 is a flowchart of an information identification-based power Internet of Things protection method according to some embodiments of present disclosure. As shown in FIG. 2, the method includes the following steps.

In step S201, security identification is performed on a data source of power Internet of Things to determine a security identification error of the data source, security identification is performed on a data channel of the power Internet of Things to determine a security identification error of the data channel, and security identification is performed on data storage of the power Internet of Things to determine a security identification error of the data storage.

Specifically, in some embodiments of the present disclosure, the influence of the Internet of Things information on access user traffic safety management is reflected based on the influence of the information identification error of the data source network, the information identification error of the data channel network, and the information identification error of the data storage network of the power Internet of Things. The security identification is performed on the data source of power Internet of Things to determine the security identification error of the data source, the security identification is performed on the data channel of the power Internet of Things to determine the security identification error of the data channel, and the security identification is performed on the data storage of the power Internet of Things to determine the security identification error of the data storage.

In step S202, multiple fuzzy-uncertainty three-dimensional trapezoidal fuzzy sets with different levels of data transmission rates is calculated by using a statistical analysis method according to the data transmission rates of a monitoring data center of the power Internet of Things, multiple fuzzy-uncertainty three-dimensional trapezoidal fuzzy sets with different levels of data storage sharing scales is calculated by using the statistical analysis method according to the data storage sharing scales of the data monitoring center of the power Internet of Things, an information gain value is calculated according to the multiple three-dimensional trapezoidal fuzzy sets with different levels of data transmission rates and the multiple the three-dimensional trapezoidal fuzzy sets with different levels of data storage sharing scales, an information loss value is calculated according to the security identification error of the data source, the security identification error of the data channel, and the security identification error of the data storage, and a trust degree is calculated according to the information gain value and the information loss value.

Specifically, in a network layer of the power Internet of Things, the related data information of the data transmission rate is obtained from an Internet of Things monitoring data center, and the statistical analysis method is adopted to calculate and determine nine three-dimensional trapezoidal fuzzy sets respectively with fuzzy uncertainty of extremely low data transmission rate, very low data transmission rate, low data transmission rate, lower data transmission rate, medium data transmission rate, higher data transmission rate, high data transmission rate, very high data transmission rate and extremely high data transmission rate $$v_{Di}(i=1, 2, \ldots, 9):$$

$$v_{Di} = (v_{DiL}, v_{DiM}, v_{DiU}) = [(v_{DiL1}, v_{DiL2}, v_{DiL3}, v_{DiL4}; k_{DviL})], (v_{DiM1}, v_{DiM2}, v_{DiM3}, v_{DiM4}; k_{DviM}), (v_{DiU1}, v_{DiU2}, v_{DiU3}, v_{DiU4}; k_{DviU})];$$

where, $v_{Di}$ is the three-dimensional trapezoidal fuzzy set with the $i^{th}$ data transmission rate, $v_{DiL}$, $v_{DiM}$, $v_{DiU}$ are respectively the lower bound fuzzy set, the middle bound fuzzy set and the upper bound fuzzy set of the three-dimensional trapezoidal fuzzy set with the $i^{th}$ data transmission rate, $k_{DviL}$, $k_{DviM}$, $k_{DviU}$ are respectively the membership coefficient of the lower bound fuzzy set, the membership coefficient of the middle bound fuzzy set and the membership coefficient of the upper bound fuzzy set, $v_{DiLj}$, $v_{DiMj}$, $v_{DiUj}$ j=1, 2, 3, 4 are the fuzzy number of the lower bound fuzzy set of the three-dimensional trapezoidal fuzzy set with the $i^{th}$ data transmission rate, the fuzzy number of the middle bound fuzzy set of the three-dimensional trapezoidal fuzzy set with the $i^{th}$ data transmission rate, and the fuzzy number of the upper bound fuzzy set of the three-dimensional trapezoidal fuzzy set with the $i^{th}$ data transmission rate.

At a platform layer of the power Internet of Things, the related data information of the data storage sharing scale is obtained from the Internet of Things monitoring data center, and the statistical analysis method is adopted to calculate and determine nine three-dimensional trapezoidal fuzzy sets respectively with fuzzy uncertainty of extremely low data storage sharing scale, very low data storage sharing scale, low data storage sharing scale, lower data storage sharing scale, medium data storage sharing scale, higher data storage sharing scale, high data storage sharing scale, very high data storage sharing scale and extremely high data storage sharing scale $S_{Di}$ (i=1, 2, . . . , 9):

$$S_{Di} = (S_{DiL}, S_{DiM}, S_{DiU}) = [(S_{DiL1}, S_{DiL2}, S_{DiL3}, S_{DiL4}; k_{DSiL})], (S_{DiM1}, S_{DiM2}, S_{DiM3}, S_{DiM4}; k_{DSiM}),$$

-continued $$(S_{DiU1}, S_{DiU2}, S_{DiU3}, S_{DiU4}; k_{DSiU})];$$

where, $S_{Di}$ is the three-dimensional trapezoidal fuzzy set with the $i^{th}$ data storage sharing scale, $S_{DiL}$, $S_{DiM}$, $S_{DiU}$ are respectively the lower bound fuzzy set, the middle bound fuzzy set and the upper bound fuzzy set of the three-dimensional trapezoidal fuzzy set with the $i^{th}$ data storage sharing scale, $k_{DviL}$, $k_{DviM}$, $k_{DviU}$ are respectively the membership coefficient of the lower bound fuzzy set, the membership coefficient of the middle bound fuzzy set and the membership coefficient of the upper bound fuzzy set, $v_{DiLj}$, $v_{DiMj}$, $v_{DiUj}$ j=1, 2, 3, 4 are the fuzzy number of the lower bound fuzzy set of the three-dimensional trapezoidal fuzzy set with the $i^{th}$ data storage sharing scale, the fuzzy number of the middle bound fuzzy set of the three-dimensional trapezoidal fuzzy set with the $i^{th}$ data storage sharing scale, and the fuzzy number of the upper bound fuzzy set of the three-dimensional trapezoidal fuzzy set with the $i^{th}$ data storage sharing scale.

Further, an information revenue value is calculated according to the multiple three-dimensional trapezoidal fuzzy sets at different levels of the data transmission rate and the multiple three-dimensional trapezoidal fuzzy sets of different levels of the data storage sharing scale. An information loss value is calculated according to the security identification error of the data source, the security identification error of the data channel, and the security identification error of the data storage, and a trust degree is calculated according to the information revenue value and the information loss value.

In step S203, an objective function is constructed according to the trust degree, where the objective function is used for solving to obtain a control input in response to obtaining a minimum value of the security identification error of the data source, a minimum value of the security identification error of the data channel, and a minimum value of the security identification error of the data storage, and obtaining a maximum value of the trust degree.

Specifically, an information identification-based power Internet of Things protection optimization model is constructed. This model is optimized with the target of a maximum value obtained based on a average value of the user trust degree, and a minimum value obtained based on the security identification error of the data source, the security identification error of the data channel and the security identification error of the data storage.

In step S204, the objective function is solved according to an extreme learning machine method to obtain a target control input, and a power Internet of Things system is controlled according to the target control input.

Specifically, the target function is solved by using the baseline learning machine method to obtain the target control input. The target control input includes an optimal channel and an information adjustment amount. The power Internet of Things is controlled according to the target control input, so as to improve the security protection of the power Internet of Things.

Through applying the technical solution of the present disclosure, in the information identification-based power Internet of Things protection method, the security identification is performed on a data source of power Internet of Things to determine the security identification error of the data source, the security identification is performed on the data channel of the power Internet of Things to determine the security identification error of the data channel, and the security identification is performed on the data storage of the power Internet of Things to determine the security identification error of the data storage; the multiple fuzzy-uncertainty three-dimensional trapezoidal fuzzy sets with different levels of data transmission rates is calculated by using the statistical analysis method according to the data transmission rates of the monitoring data center of the power Internet of Things, the multiple fuzzy-uncertainty three-dimensional trapezoidal fuzzy sets with different levels of data storage sharing scales is calculated by using the statistical analysis method according to the data storage sharing scales of the data monitoring center of the power Internet of Things, the information gain value is calculated according to the multiple three-dimensional trapezoidal fuzzy sets with different levels of data transmission rates and the multiple the three-dimensional trapezoidal fuzzy sets with different levels of data storage sharing scales, the information loss value is calculated according to the security identification error of the data source, the security identification error of the data channel, and the security identification error of the data storage, and the trust degree is calculated according to the information gain value and the information loss value; the objective function is constructed according to the trust degree, where the objective function is used for solving to obtain the control input in response to obtaining the minimum value of the security identification error of the data source, the minimum value of the security identification error of the data channel, and the minimum value of the security identification error of the data storage, and obtaining a maximum value of the trust degree; and the objective function is solved according to the extreme learning machine method to obtain the target control input, and the power Internet of Things system is controlled according to the target control input. In some embodiments of the present disclosure the statistical analysis method is adopted to determine a data information identification error of a source network, a place name, a user and a node of the power Internet of Things, a data information identification error of a channel network, a place name, a user and a node of the power Internet of Things, and a data information identification error of a storage network, a place name, a user and a node of the power Internet of Things. The method can solve the problem in the related art that the information identification-based power Internet of Things security protection method has not been provided yet through constructing the extreme learning machine model to solve the objective function to obtain the target control input, and the objective function is set with the error minimization of the source network, the channel network and the storage network, and the trust degree maximization of a power Internet of Things user in the power Internet of Things system.

In order to obtain the security identification error of the data source of the power Internet of Things, in some embodiments, step S201 includes the following steps.

In step S2011, a data source network of the power Internet of Things and location data information of the data source network, user data information of the data source network and node data information of the data source network are collected by using an Internet of Things sensing system, and a data information identification error of the data source network, a data information identification error of the location data information of the data source network, a data information identification error of the user data information of the data source network and a data information identification error of the node data information of the data source network are determined respectively by using the statistical analysis method.

Specifically, the Internet of Things sensing system is adopted to obtain data information of a data source network, a place name, a user, and a node, which are respectively represented as $$F_G^{DS}, F_P^{DS}, F_U^{DS}, F_N^{DS}$$

of the power Internet of Things system from a data monitoring center. The statistical analysis method is adopted to calculate and determine data information identification errors of a data source network, a place name, a user, and a node, which are respectively represented as $$e_G^F, e_P^F, e_U^F, e_N^F$$

of the power Internet of Things system.

In step S2012, the security identification error of the data source is calculated according to the data information identification error of the data source network, the data information identification error of the location data information of the data source network, the data information identification error of the user data information of the data source network and the data information identification error of the node data information of the data source network:

$$e_F = e_G^F + e_P^F + e_U^F + e_N^F;$$

where $$e_{P_{e_F}}$$

is the security identification error of the data source, $$e_G^F$$

is the data information identification error of the data source network, $$e_P^F$$

is the data information identification error of the location data information of the data source network, $$e_U^F$$

is the data information identification error of the user data information of the data source network, and $$e_N^F$$

is the data information identification error of the node data information of the data source network.

Specifically, the data information identification errors of the data source network, the place name, the user, and the node of the power Internet of Things system are summed to determine the security identification error of the data source.

In order to obtain the security identification error of the data channel of the power Internet of Things, in some embodiments, step S201 includes the following steps.

In step S2013, a data channel network of the power Internet of Things and location data information of the data channel network, user data information of the data channel network and node data information of the data channel network are collecting by using the Internet of Things sensing system, and a data information identification error of the data channel network, a data information identification error of the location data information of the data channel network, a data information identification error of the user data information of the data channel network and a data information identification error of the node data information of the data channel network respectively are determined by using the statistical analysis method.

Specifically, the Internet of Things sensing system is adopted to obtain data information of a data channel network, a place name, a user, and a node, which are respectively represented as $$X_G^{DS}, X_P^{DS}, X_U^{DS}, X_N^{DS}$$

of the power Internet of Things system from a data monitoring center. The statistical analysis method is adopted to calculate and determine data information identification errors of a data channel network, a place name, a user, and a node, which are respectively represented as, $$e_G^X, e_P^X, e_U^X, e_N^X$$

of the power Internet of Things system.

In step S2014, the security identification error of the data channel is calculated according to the data information identification error of the data channel network, the data information identification error of the location data information of the data channel network, the data information identification error of the user data information of the data channel network and the data information identification error of the node data information of the data channel network:

$$e_X = e_G^X + e_P^X + e_U^X + e_N^X;$$

where $e_X$ is the security identification error of the data channel, $$e_G^X$$

is the data information identification error of the data channel network, $$e_P^X$$

is the data information identification error of the location data information of the data channel network, $$e_U^X$$

is the data information identification error of the user data information of the data channel network, and $$e_N^X$$

is the data information identification error of the node data information of the data channel network.

Specifically, the data information identification errors of the data channel network, the place name, the user and the node are summed to determine the security identification error of the data channel.

In order to obtain the security identification error of the data storage of the power Internet of Things, in some embodiments, step S201 includes the following steps.

In step S2015, a data storage network of the power Internet of Things and location data information of the data storage network, user data information of the data storage network and node data information of the data storage network are collected by using the Internet of Things sensing system, and a data information identification error of the data storage network, a data information identification error of the location data information of the data storage network, a data information identification error of the user data information of the data storage network and a data information identification error of the node data information of the data storage network are determined respectively by using the statistical analysis method.

Specifically, the Internet of Things sensing system is adopted to obtain the data information of the data storage network, the place name, the user and the node, which are respectively represented as $$S_G^{DS}, S_P^{DS}, S_U^{DS}, S_N^{DS}$$

of the power Internet of Things system from the data monitoring center. The statistical analysis method is adopted to calculate and determine data information identification errors of a data storage network, a place name, a user, and a node, which are respectively represented as $$e_G^S, e_P^S, e_U^S, e_N^S$$

of the power Internet of Things system.

In step S2016, the security identification error of the data storage is calculated according to the data information identification error of the data storage network, the data information identification error of the location data information of the data storage network, the data information identification error of the user data information of the data storage network and the data information identification error of the node data information of the data storage network:

$$e_S = e_G^S + e_P^S + e_U^S + e_N^S;$$

where $e_S$ is the security identification error of the data storage, $$e_G^S$$

is the data information identification error of the data storage network, $$e_P^S$$

is the data information identification error of the location data information of the data storage network, $$e_U^S$$

is the data information identification error of the user data information of the data storage network, and $$e_N^S$$

is the data information identification error of the node data information of the data storage network.

Specifically, the data information identification errors of the data storage network, the place name, the user and the node of the power Internet of Things system are summed to determine the security identification error of the data storage.

To obtain the trust degree, in some embodiments, step S202 includes the following steps In step S2021, the multiple three-dimensional trapezoidal fuzzy sets with different levels of data transmission rates and the multiple three-dimensional trapezoidal fuzzy sets with different levels of data storage sharing scales are substituted into a calculation formula of the information gain value to calculate the information gain value R corresponding to the multiple three-dimensional trapezoidal fuzzy sets with different levels of data transmission rates and the multiple three-dimensional trapezoidal fuzzy sets with different levels of data storage sharing scales:

$$R = E\left[\vee_{i=1}^{9} k_{Dvi} v_{Di} \otimes \vee_{i=1}^{9} k_{DSi} S_{Di} \otimes k_{Mi} M_H\right];$$

where R is an information gain value formed by the power Internet of Things providing data collection, transmission, storage and sharing for an accessing user, $$\vee_{i=1}^{9} k_{Dvi} v_{Di}$$

is an information gain value in cases where the fuzzy-uncertainty three-dimensional trapezoidal fuzzy sets of the data transmission rates are at different levels when the power Internet of Things provides a service to the accessing user, $k_{Dvi}$ is a unit gain value in cases where the power Internet of Things provides a fuzzy-uncertainty three-dimensional trapezoidal fuzzy set of an $i^{th}$ data transmission rate, $$\vee_{i=1}^{9} k_{DSi} S_{Di}$$

is an information gain value in cases where the fuzzy-uncertainty three-dimensional trapezoidal fuzzy sets of the data storage scales are at different levels when the power Internet of Things provides the service to the accessing user, $k_{DSi}$ is a unit gain value in cases where the power Internet of Things provides a fuzzy-uncertainty three-dimensional trapezoidal fuzzy set of an $i^{th}$ data storage sharing scale, $k_{Mi}M_H$ is an information gain value when the power Internet of Things provides a data collection service for the accessing user at a sensing layer, $k_{Mi}$ is a unit gain value when the power Internet of Things provides the data collection service for the accessing user at the sensing layer, E[ ] is to obtain a desired value for [ ], and $$\vee_{i=1}^{9}$$

represents a union set of nine fuzzy sets.

Specifically, in the sensing layer, the data information of the data user is obtained by means of the sensing system. At the access layer, the data sharing and interaction of the access user is achieved by means of a big data system. At the network layer, data transmission is realized by means of a network system, so that the access user can obtain sufficient information by using the Internet of Things to obtain revenue. At the application layer, the data fusion and application of the access user are realized. The information revenue value of the access user in the network system is calculated according to the above formula.

In the sensing layer of the power Internet of Things, the related data information of the data transmission rate is obtained from the Internet of Things monitoring data center, and the statistical analysis method is adopted to calculate the three-dimensional trapezoidal fuzzy set with the fuzzy uncertainty of the data acquisition $M_H$:

$$M_H = (M_{HL}, M_{HM}, M_{HU}) = [(M_{HL1}, M_{HL2}, M_{HL3}, M_{HL4}; K_{HL})];$$
$$(M_{HM1}, M_{HM2}, M_{HM3}, M_{HM4}; K_{HM});$$
$$(M_{HU1}, M_{HU2}, M_{HU3}, M_{HU4}; K_{HU})];$$

where, $M_H$ is the three-dimensional trapezoidal fuzzy set with the fuzzy uncertainty of the data acquisition provided for a power data user by the Internet of Things at the sensing layer, $M_{HL}$, $M_{HM}$, $M_{HU}$ are respectively the lower bound fuzzy set, the middle bound fuzzy set and the upper bound fuzzy set of the three-dimensional trapezoidal fuzzy set with the fuzzy uncertainty of the data acquisition provided for a power data user by the Internet of Things at the sensing layer, $K_{HL}$, $K_{HM}$, $K_{HU}$ are respectively the membership coefficient of the lower bound fuzzy set, the membership coefficient of the middle bound fuzzy set and the membership coefficient of the upper bound fuzzy set, $M_{HLj}$, $M_{HMj}$, $M_{HUj}$ (j=1, 2, 3, 4) are the fuzzy number of the lower bound fuzzy set of the three-dimensional trapezoidal fuzzy set with the fuzzy uncertainty of the data acquisition provided for a power data user by the Internet of Things at the sensing layer, the fuzzy number of the middle bound fuzzy set of the three-dimensional trapezoidal fuzzy set with the fuzzy uncertainty of the data acquisition provided for a power data user by the Internet of Things at the sensing layer, and the fuzzy number of the upper bound fuzzy set of the three-dimensional trapezoidal fuzzy set with the fuzzy uncertainty of the data acquisition provided for a power data user by the Internet of Things at the sensing layer. J represents a collection period.

In step S2022, the security identification error of the data source, the security identification error of the data channel and the security identification error of the data storage are substituted into a calculation formula of the information loss value to calculate the information loss value L of the security identification error of the data source, the security identification error of the data channel and the security identification error of the data storage:

$$L = k_1^F k_2^F e_F + k_1^X k_2^X e_X + k_1^S k_2^S e_S;$$

where L is an information loss value of market trading caused by the security identification error of the data source, the security identification error of the data channel and the security identification error of the data storage formed in the power Internet of Things;

$$k_1^F$$

is an influence coefficient or weight coefficient of the security identification error of the data source on power data distribution, $$k_2^F$$

is a unit power information loss value caused by the security identification error of the data source;

$$k_1^X$$

is an influence coefficient or weight coefficient of the security identification error of the data channel on the power data distribution, $$k_2^X$$

is a unit power information loss value caused by the security identification error of the data channel;

$$k_1^S$$

is an influence coefficient or weight coefficient of the security identification error of the data storage on the power data distribution, $$k_2^S$$

is a unit power information loss value caused by the security identification error of the data storage.

Specifically, the security identification errors of the data source, the data channel and data storage formed in the power Internet of Things, will cause the information loss of the market transaction, and the value of the information loss is calculated according to the above formula.

In step S2023, the information gain value and the information loss value is substituted into a calculation formula of the trust degree to calculate the trust degree B:

$$B = \frac{R}{R + L}.$$

Specifically, in the power Internet of Things, the sensing layer, the access layer and the application layer provide information to a power Internet of Things data user to provide the user with benefits. Therefore, the average value of the credibility of the power Internet of Things data user in the power Internet of Things system can be calculated as mentioned above.

To construct the objective function, in some embodiments, step S203 includes the following steps.

In step S2031, the objective function is constructed according to the trust degree, where the objective function satisfies a first condition, a second condition, a third condition, a fourth condition, a fifth condition, a sixth condition, a seventh condition, and an eighth condition:

$$\max B;$$

$$\min(e_F + e_X + e_S);$$

where the first condition is $\underline{V}_{Vi} \le V_{Vi} \le \overline{V}_{Vi}$, in which $V_{Vi}$ is an actual signal traffic of an $i^{th}$ user, $\overline{V}_{Vi}$ is an allowable maximum value of the signal traffic of the $i^{th}$ user, and $\underline{V}_{Vi}$ is an allowable minimum value of the signal traffic of the $i^{th}$ user; the second condition is, $\underline{v}_{Vi} \le v_{Vi}$ in which $v_{Vi}$ is an actual signal transmission speed of the $i^{th}$ user, and $\underline{v}_{Vi}$ is an allowable minimum value of the signal transmission speed of the $i^{th}$ user; the third condition is, $\underline{v}_{Xi} \le v_{Xi} \le \overline{v}_{Xi}$ in which $v_{Xi}$ is an actual transmission speed of an $i^{th}$ channel, $\overline{v}_{Xi}$ is an allowable maximum value of the transmission speed of the $i^{th}$ channel, and $\underline{v}_{Vi}$ is an allowable minimum value of the transmission speed of the $i^{th}$ channel; the fourth condition is $\underline{k}_{QoS} \le k_{QoS} \le \overline{k}_{QoS}$, in which $k_{QoS}$ is an actual network quality of service, $\overline{k}_{QoS}$ is an allowable maximum value of the network quality of service, and $\underline{k}_{QoS}$ is an allowable minimum value of the network quality of service; the fifth condition is $\underline{t}_{Xi} \le t_{Xi} \le \overline{t}_{Xi}$, in which $t_{Xi}$ is an actual signal transmission delay of the $i^{th}$ channel, $\overline{t}_{Xi}$ is an allowable maximum value of the signal transmission delay of the $i^{th}$ channel, and $\underline{t}_{Xi}$ is an allowable minimum value of the signal transmission delay of the $i^{th}$ channel; the sixth condition is $\underline{P}_{Ui} \le P_{Ui} \le \overline{P}_{Ui}$, in which $P_{Ui}$ is an actual signal power of the $i^{th}$ user, $\overline{P}_{Ui}$ is an allowable maximum value of the signal power of the $i^{th}$ user, and $\overline{P}_{Ui}$ is an allowable minimum value of the signal power of the $i^{th}$ user; and the seventh condition is $\underline{R}_i \le R_i \le \overline{R}_i$, in which $R_i$ is actual congestion of an $i^{th}$ node, $\overline{R}_i$ is an allowable maximum value of the congestion of the $i^{th}$ node, and $\underline{R}_i$ is an allowable minimum value of the congestion of the $i^{th}$ node.

Specifically, in the information identification-based power Internet of Things protection optimization model, the target of security protection includes: 1) maximizing the average value of the credibility of the power Internet of Things data user in the network system; and 2) minimizing the information identification errors of the power data source, the data channel and the data storage in the power Internet of Things. The average value of the credibility of the power Internet of Things data user in the network system is maximized, and the information identification error of the power data source, the data channel and the data storage in the power Internet of Things is minimized to obtain the objective function as mentioned above.

Further, constraint conditions are constructed for the model.

One, in the constraint condition of the user signal traffic, the $i^{th}$ user signal traffic is required to satisfy a condition that the $i^{th}$ user signal traffic is greater than a allowable maximum value and is less than a allowable minimum value:

$$\underline{V}_{Vi} \le V_{Vi} \le \overline{V}_{Vi};$$

In the formula, $V_{Vi}$, $\overline{V}_{Vi}$, $\underline{V}_{Vi}$ are respectively an actual value of the $i^{th}$ user signal traffic, the allowable maximum value and the allowable minimum value.

Two, in the constraint condition of the user signal transmission speed, the $i^{th}$ user signal transmission speed is required to satisfy a condition that the $i^{th}$ user signal transmission speed is greater than the allowable minimum value:

$$\underline{v}_{Vi} \le v_{Vi};$$

In the formula, $v_{Vi}$, $\underline{v}_{Vi}$ are respectively an actual value of the $i^{th}$ user signal transmission speed and the allowable minimum value.

Three, in the constraint condition of the channel traffic, the $i^{th}$ channel traffic is required to satisfy a condition that the $i^{th}$ channel traffic is greater than the allowable maximum value and is less than the allowable minimum value:

$$\underline{V}_{Xi} \le V_{Xi} \le \overline{V}_{Xi};$$

In the formula, $V_{Xi}$, $\overline{V}_{Xi}$, $\underline{V}_{Xi}$ are respectively an actual value of the $i^{th}$ channel traffic, the allowable maximum value and the allowable minimum value.

Four, in the constraint condition of the channel transmission speed, the $i^{th}$ channel transmission speed is required to satisfy a condition that the $i^{th}$ channel transmission speed is greater than the allowable maximum value and is less than the allowable minimum value:

$$\underline{v}_{Xi} \le v_{Xi} \le \overline{v}_{Xi};$$

In the formula, $v_{Xi}$, $\overline{v}_{Xi}$, $\underline{v}_{Xi}$ are respectively an actual value of the $i^{th}$ channel transmission speed, the allowable maximum value and the allowable minimum value.

Five, in the constraint condition of the network service quality, the network service quality is required to satisfy a condition that the network service quality is greater than the allowable maximum value and is less than the allowable minimum value:

$$\underline{k}_{QoS} \le k_{QoS} \le \overline{k}_{QoS};$$

In the formula, $k_{QoS}$, $\overline{k}_{QoS}$, $\underline{k}_{QoS}$ are respectively an actual value of the network service quality, the allowable maximum value and the allowable minimum value.

Six, in the constraint condition of the signal transmission delay, the $i^{th}$ channel signal transmission delay is required to satisfy a condition that the $i^{th}$ channel signal transmission delay is greater than the allowable maximum value and is less than the allowable minimum value:

$$\underline{t}_{Xi} \le t_{Xi} \le \overline{t}_{Xi};$$

In the formula, $t_{Xi}$, $\overline{t}_{Xi}$, $\underline{t}_{Xi}$ are respectively an actual value of the $i^{th}$ channel signal transmission delay, the allowable maximum value and the allowable minimum value.

Seven, in the constraint condition of the signal power, the $i^{th}$ user signal power is required to satisfy a condition that the $i^{th}$ user signal power is greater than the allowable maximum value and is less than the allowable minimum value:

$$\underline{P}_{Ui} \le P_{Ui} \le \overline{P}_{Ui};$$

In the formula, $P_{Ui}$, $\overline{P}_{Ui}$, $\overline{P}_{Ui}$ are respectively an actual value of the $i^{th}$ user signal power, the allowable maximum value and the allowable minimum value.

Eight, in the constraint condition of the node congestion, the $i^{th}$ node congestion is required to satisfy a condition that the $i^{th}$ node congestion is greater than the allowable maximum value and is less than the allowable minimum value:

$$\underline{R}_i \le R_i \le \overline{R}_i;$$

In the formula, $R_i$, $\overline{R}_i$, $\underline{R}_i$ are respectively an actual value of the $i^{th}$ node congestion, the allowable maximum value and the allowable minimum value.

To obtain the target control input, in some embodiments, step S204 includes the following steps.

In step S2041, training samples, an initial residual, the maximum number of iterations and an initial Lagrange multiplier are obtained, the number of samples is determined according to the training samples, an input weight and a bias value are randomly generated, and the number of samples, the input weight, the initial residual and the initial Lagrange multiplier are inputted into a formula to calculate an output weight:

$$\beta_{k+1} = \left(H^T H + 2/R\mu I\right)^{-1} H^T\left(y - e_k + \lambda_k/\mu\right);$$

where $\beta_{k+1}$ is the output weight calculated by k iterations, H is an output matrix of a hidden layer, $H\beta=Y$, Y is an output matrix of the training samples, $\beta$ is the output weight between the hidden layer and an output layer, $e_k$ is a residual of the k iterations, R is a regular coefficient, $\lambda_k$ is the Lagrange multiplier in the k iterations, I is a unit matrix, $\mu$ $\mu$ is a penalty coefficient, and the penalty coefficient satisfies $\mu=2N/\|y\|_1$.

Specifically, the training samples are preprocessed, and the number N of samples is determined according to the initialization of robust extreme learning machine model parameters. An input weight w and a bias value b are randomly generated according to an algorithm structure. Through setting a loop count k=0, taking an initial residual $e_k=0$ and an initial Lagrange multiplier $\lambda_k=0$, and the output weight $\beta_{k+1}$ of the next iteration is updated according to the above formula.

When the constraint deviation is small, the value of the penalty coefficient $\mu$ is reduced to perform fine adjustment, and when the constraint deviation is large, the value of the penalty coefficient $\mu$ is required to be increased to enhance the strength of the penalty term.

where in cases where the training samples are $(x_i, y_i)\in R^n\times R^m$, H satisfies:

$$H(w_1 \ldots w_s, x_1 \ldots x_N, b_1 \ldots b_s) = \begin{bmatrix} g(w_1x_1+b_1) & \ldots & g(w_sx_1+b_s) \\ \vdots & \ldots & \vdots \\ g(w_1x_N+b_1) & \ldots & g(w_sx_N+b_s) \end{bmatrix};$$

where w is the input weight, b is the bias value, and g(•) is an activation function;

Specifically, b is a hidden layer neuron bias value introduced by model effective fitting training data; and the activation function g(•) can be a sigmoid function with the infinite micro-characteristic function, and w is an input weight for connecting the input layer and the hidden layer in the extreme learning machine algorithm structure.

In step S2042, the penalty coefficient is updated according to the output weight, and a model is trained according to the output weight and the updated penalty coefficient:

$$\beta_{k+1} = \left(H^TH + 2/R\mu I\right)^{-1}H^T\left(y - e_k + \lambda_k/\mu\right);$$

$$\mu = 2N/\|y\|_1 e_{k+1} = shink\left(H\beta_{k+1} + \frac{\lambda_k}{\mu}, 1/\mu\right);$$

$$\lambda_{k+1} = \lambda_k + \mu(y - H\beta_{k+1} - e_{k+1}).$$

Specifically, $\mu$ is calculated according to the updated $\beta_{k+1}$, and $e_{k+1}$ is updated according to $\beta_{k+1}$ and $\mu$ in combination with the following two formulas:

$$\beta_{k+1} = \left(H^TH + 2/R\mu I\right)^{-1}H^T\left(y - e_k + \lambda_k/\mu\right);$$

$$\mu = 2N/\|y\|_1 e_{k+1} = shink\left(H\beta_{k+1} + \frac{\lambda_k}{\mu}, 1/\mu\right);$$

$\lambda_{k+1}$ is updated according to $\beta_{k+1}$ and $e_{k+1}$ with the following formula:

$$\lambda_{k+1} = \lambda_k + \mu(y - H\beta_{k+1} - e_{k+1})$$

In step S2043, when the number of iterations reaches the maximum number, an extreme learning machine model is constructed according to the output weight, the input weight and the bias value during the last iteration, and the target control input is solved according to the extreme learning machine model.

Specifically, each cycle k is superposed by one, the cycle calculation is ended, and the latest calculated value $\beta$ is used as an output. A robust extreme learning machine model is constructed according to the parameter input weight w, the offset value b and the output weight $\beta$. The target function is solved according to the constructed extreme learning machine model to obtain the target control input.

It should be noted that the steps shown in the flowcharts of the accompanying drawings can be executed in a computer system such as a group of computer-executable instructions, and although a logical order is shown in the flowcharts, in some cases, the steps shown or described can be performed in an order different from that described herein.

In some embodiments of the present disclosure, an information identification-based power Internet of Things protection apparatus is further provided, and it should be noted that the information identification-based power Internet of Things protection apparatus in some embodiments of present disclosure can be arranged for performing the information identification-based power Internet of Things protection method in some embodiments of present disclosure. The apparatus is arranged for implementing the embodiments and exemplary implementations, and details are not described again. As used below, the term "module" may implement a combination of software and/or hardware of a predetermined function. Although the apparatus described in the following embodiments is exemplarily implemented in software, implementation of hardware or a combination of software and hardware is also possible and conceived.

The following describes the information identification-based power Internet of Things protection apparatus provided in some embodiments of present disclosure.

Figure 3:
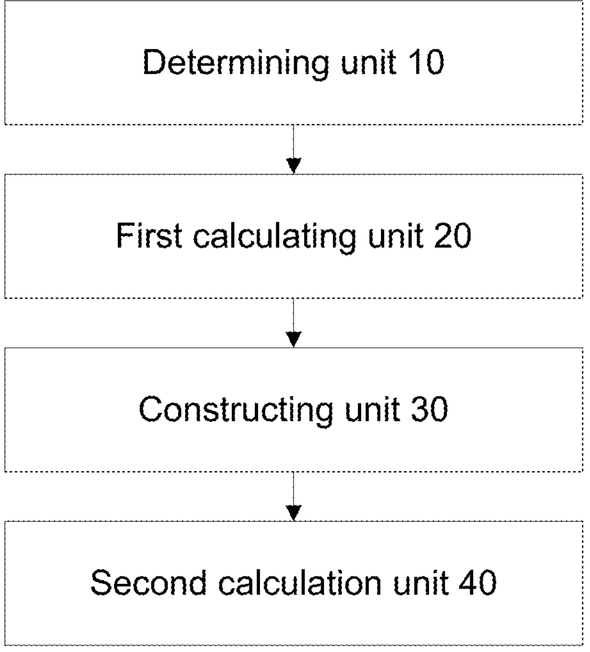
FIG. 3 is a structural block diagram of an information identification-based power Internet of Things protection apparatus according to some embodiments of present disclosure.

FIG. 3 is a structural block diagram of an information identification-based power Internet of Things protection apparatus according to some embodiments of present disclosure. As shown in FIG. 3, the apparatus includes:

a determining unit 10, arranged for performing security identification on a data source of power Internet of Things to determine a security identification error of the data source, performing security identification on a data channel of the power Internet of Things to determine a security identification error of the data channel, and performing security identification on data storage of the power Internet of Things to determine a security identification error of the data storage;

a first calculating unit 20 is arranged for calculating multiple fuzzy-uncertainty three-dimensional trapezoidal fuzzy sets with different levels of data transmission rates by using a statistical analysis method according to the data transmission rates of a monitoring data center of the power Internet of Things, calculating multiple fuzzy-uncertainty three-dimensional trapezoidal fuzzy sets with different levels of data storage sharing scales by using the statistical analysis method according to the data storage sharing scales of the data monitoring center of the power Internet of Things, calculating an information gain value according to the multiple three-dimensional trapezoidal fuzzy sets with different levels of data transmission rates and the multiple the three-dimensional trapezoidal fuzzy sets with different levels of data storage sharing scales, calculating an information loss value according to the security identification error of the data source, the security identification error of the data channel, and the security identification error of the data storage, and calculating a trust degree according to the information gain value and the information loss value;

a constructing unit 30, arranged for constructing an objective function according to the trust degree, where the objective function is used for solving to obtain a control input in response to obtaining a minimum value of the security identification error of the data source, a minimum value of the security identification error of the data channel, and a minimum value of the security identification error of the data storage, and obtaining a maximum value of the trust degree; and a second calculation unit 40 is arranged for solving the objective function according to an extreme learning machine method to obtain a target control input, and controlling a power Internet of Things system according to the target control input.

Through applying the technical solution of the present disclosure, the determining unit performs security identification on the data source of power Internet of Things to determine the security identification error of the data source, performs security identification on the data channel of the power Internet of Things to determine the security identification error of the data channel, and performs security identification on data storage of the power Internet of Things to determine a security identification error of the data storage; the first calculating unit calculates multiple fuzzy-uncertainty three-dimensional trapezoidal fuzzy sets with different levels of data transmission rates by using a statistical analysis method according to the data transmission rates of a monitoring data center of the power Internet of Things, calculates multiple fuzzy-uncertainty three-dimensional trapezoidal fuzzy sets with different levels of data storage sharing scales by using the statistical analysis method according to the data storage sharing scales of the data monitoring center of the power Internet of Things, calculates the information gain value according to the multiple three-dimensional trapezoidal fuzzy sets with different levels of data transmission rates and the multiple the three-dimensional trapezoidal fuzzy sets with different levels of data storage sharing scales, calculates the information loss value according to the security identification error of the data source, the security identification error of the data channel, and the security identification error of the data storage, and calculates the trust degree according to the information gain value and the information loss value; the constructing unit constructs the objective function according to the trust degree, where the objective function is used for solving to obtain the control input in response to obtaining the minimum value of the security identification error of the data source, the minimum value of the security identification error of the data channel, and the minimum value of the security identification error of the data storage, and obtaining the maximum value of the trust degree; and the second calculation unit solves the objective function according to the extreme learning machine method to obtain the target control input, and controls the power Internet of Things system according to the target control input. In some embodiments of the present disclosure the statistical analysis method is adopted to determine a data information identification error of a source network, a place name, a user and a node of the power Internet of Things, a data information identification error of a channel network, a place name, a user and a node of the power Internet of Things, and a data information identification error of a storage network, a place name, a user and a node of the power Internet of Things. The method can solve the problem in the related art that the information identification-based power Internet of Things security protection method has not been provided yet through constructing the extreme learning machine model to solve the objective function to obtain the target control input, and the objective function is set with the error minimization of the source network, the channel network and the storage network, and the trust degree maximization of a power Internet of Things user in the power Internet of Things system.

In order to obtain the security identification error of the data source of the power Internet of Things, in some embodiments, the determining unit includes:

a first determining module, arranged for collecting a data source network of the power Internet of Things and location data information of the data source network, user data information of the data source network and node data information of the data source network by using an Internet of Things sensing system, and determining a data information identification error of the data source network, a data information identification error of the location data information of the data source network, a data information identification error of the user data information of the data source network and a data information identification error of the node data information of the data source network respectively by using the statistical analysis method; and a first calculation module, arranged for calculating the security identification error of the data source according to the data information identification error of the data source network, the data information identification error of the location data information of the data source network, the data information identification error of the user data information of the data source network and the data information identification error of the node data information of the data source network:

$$e_F = e_G^F + e_P^F + e_U^F + e_N^F;$$

where $e_F$ is the security identification error of the data source, $$e_G^F$$

is the data information identification error of the data source network, $$e_P^F$$

is the data information identification error of the location data information of the data source network, $$e_U^F$$

is the data information identification error of the user data information of the data source network, and $$e_N^F$$

is the data information identification error of the node data information of the data source network.

In order to obtain the security identification error of the data channel of the power Internet of Things, in some embodiments, the determining unit includes:

- a second determining module, arranged for collecting a data channel network of the power Internet of Things and location data information of the data channel network, user data information of the data channel network and node data information of the data channel network by using the Internet of Things sensing system, and determining a data information identification error of the data channel network, a data information identification error of the location data information of the data channel network, a data information identification error of the user data information of the data channel network and a data information identification error of the node data information of the data channel network respectively by using the statistical analysis method; and
- a second calculation module, arranged for calculating the security identification error of the data channel according to the data information identification error of the data channel network, the data information identification error of the location data information of the data channel network, the data information identification error of the user data information of the data channel network and the data information identification error of the node data information of the data channel network:

$$e_X = e_G^X + e_P^X + e_U^X + e_N^X;$$

where $e_X$ is the security identification error of the data channel, $$e_G^X$$

is the data information identification error of the data channel network, $$e_P^X$$

is the data information identification error of the location data information of the data channel network, $$e_U^X$$

is the data information identification error of the user data information of the data channel network, and $$e_N^X$$

is the data information identification error of the node data information of the data channel network.

In order to obtain the security identification error of the data storage of the power Internet of Things, in some embodiments, the determining unit includes:

- collecting a data storage network of the power Internet of Things and location data information of the data storage network, user data information of the data storage network and node data information of the data storage network by using the Internet of Things sensing system, and determining a data information identification error of the data storage network, a data information identification error of the location data information of the data storage network, a data information identification error of the user data information of the data storage network and a data information identification error of the node data information of the data storage network respectively by using the statistical analysis method; and
- a third calculation module, arranged for calculating the security identification error of the data storage according to the data information identification error of the data storage network, the data information identification error of the location data information of the data storage network, the data information identification error of the user data information of the data storage network and the data information identification error of the node data information of the data storage network:

$$e_S = e_G^S + e_P^S + e_U^S + e_N^S;$$

where $e_S$ is the security identification error of the data storage, $$e_G^S$$

is the data information identification error of the data storage network, $$e_P^S$$

is the data information identification error of the location data information of the data storage network, $$e_U^S$$

is the data information identification error of the user data information of the data storage network, and $$e_N^S$$

is the data information identification error of the node data information of the data storage network To obtain the trust degree, in some embodiments, the first calculation unit includes:

- a fourth calculation module, arranged for substituting the multiple three-dimensional trapezoidal fuzzy sets with different levels of data transmission rates and the multiple three-dimensional trapezoidal fuzzy sets with different levels of data storage sharing scales into a calculation formula of the information gain value to calculate the information gain value R corresponding to the multiple three-dimensional trapezoidal fuzzy sets with different levels of data transmission rates and the multiple three-dimensional trapezoidal fuzzy sets with different levels of data storage sharing scales:

$$R = E\left[\vee_{i=1}^{9} k_{Dvi} v_{Di} \otimes \vee_{i=1}^{9} k_{DSi} S_{Di} \otimes k_{Mi} M_H\right];$$

where R is an information gain value formed by the power Internet of Things providing data collection, transmission, storage and sharing for an accessing user, $$\vee_{i=1}^{9} k_{Dvi} v_{Di}$$

is an information gain value in cases where the fuzzy-uncertainty three-dimensional trapezoidal fuzzy sets of the data transmission rates are at different levels when the power Internet of Things provides a service to the accessing user, $k_{Dvi}$ is a unit gain value in cases where the power Internet of Things provides a fuzzy-uncertainty three-dimensional trapezoidal fuzzy set of an $i^{th}$ data transmission rate, $$\vee_{i=1}^{9} k_{DSi} S_{Di}$$

is an information gain value in cases where the fuzzy-uncertainty three-dimensional trapezoidal fuzzy sets of the data storage scales are at different levels when the power Internet of Things provides the service to the accessing user, $k_{DSi}$ is a unit gain value in cases where the power Internet of Things provides a fuzzy-uncertainty three-dimensional trapezoidal fuzzy set of an $i^{th}$ data storage sharing scale, $k_{Mi}M_H$ is an information gain value when the power Internet of Things provides a data collection service for the accessing user at a sensing layer, $k_{Mi}$ is a unit gain value when the power Internet of Things provides the data collection service for the accessing user at the sensing layer, E[ ] is to obtain a desired value for [ ], and $$\vee_{i=1}^{9}$$

represents a union set of nine fuzzy sets;

a fifth calculation module, arranged for substituting the security identification error of the data source, the security identification error of the data channel and the security identification error of the data storage into a calculation formula of the information loss value to calculate the information loss value L of the security identification error of the data source, the security identification error of the data channel and the security identification error of the data storage:

$$L = k_1^F k_2^F e_F + k_1^X k_2^X e_X + k_1^S k_2^S e_S;$$

where L is an information loss value of market trading caused by the security identification error of the data source, the security identification error of the data channel and the security identification error of the data storage formed in the power Internet of Things;

$$k_1^F$$

is an influence coefficient or weight coefficient of the security identification error of the data source on power data distribution, $$k_2^F$$

is a unit power information loss value caused by the security identification error of the data source;

$$k_1^X$$

is an influence coefficient or weight coefficient of the security identification error of the data channel on the power data distribution, $$k_2^X$$

is a unit power information loss value caused by the security identification error of the data channel;

$$k_1^S$$

is an influence coefficient or weight coefficient of the security identification error of the data storage on the power data distribution, $$k_2^S$$

is a unit power information loss value caused by the security identification error of the data storage; and a sixth calculation module, arranged for substituting the information gain value and the information loss value into a calculation formula of the trust degree to calculate the trust degree B:

$$B = \frac{R}{R + L}.$$

To construct the objective function, in some embodiments, the construction unit includes:

a construction module arranged for constructing the objective function according to the trust degree, where the objective function satisfies a first condition, a second condition, a third condition, a fourth condition, a fifth condition, a sixth condition, a seventh condition, and an eighth condition:

$$\max B;$$

$$\min(e_F + e_X + e_S);$$

where the first condition is $\underline{V}_{Vi} \le V_{Vi} \le \overline{V}_{Vi}$, in which $V_{Vi}$ is an actual signal traffic of an $i^{th}$ user, $\overline{V}_{Vi}$ is an allowable maximum value of the signal traffic of the $i^{th}$ user, and $\underline{V}_{Vi}$ is an allowable minimum value of the signal traffic of the $i^{th}$ user; the second condition is $\underline{V}_{Vi} \le V_{Vi}$, in which $v_{Vi}$ is an actual signal transmission speed of the $i^{th}$ user, and $\underline{v}_{Vi}$ is an allowable minimum value of the signal transmission speed of the $i^{th}$ user; the third condition is $\underline{v}_{Xi} \le v_{Xi} \le \overline{v}_{Xi}$, in which $v_{Xi}$ is an actual transmission speed of an $i^{th}$ channel, $\overline{v}_{Xi}$ is an allowable maximum value of the transmission speed of the $i^{th}$ channel, and $\underline{v}_{Xi}$ is an allowable minimum value of the transmission speed of the $i^{th}$ channel; the fourth condition is $\underline{k}_{QoS} \le k_{QoS} \le \overline{k}_{QoS}$, in which $k_{QoS}$ is an actual network quality of service, $\overline{k}_{QoS}$ is an allowable maximum value of the network quality of service, and $\underline{k}_{QoS}$ is an allowable minimum value of the network quality of service; the fifth condition is $\underline{t}_{Xi} \le t_{Xi} \le \overline{t}_{Xi}$, in which $t_{Xi}$ is an actual signal transmission delay of the $i^{th}$ channel, $\overline{t}_{Xi}$ is an allowable maximum value of the signal transmission delay of the $i^{th}$ channel, and $\underline{t}_{Xi}$ is an allowable minimum value of the signal transmission delay of the $i^{th}$ channel; the sixth condition is $\underline{P}_{Ui} \le P_{Ui} \le \overline{P}_{Ui}$, in which $P_{Ui}$ is an actual signal power of the $i^{th}$ user, $\overline{P}_{Ui}$ is an allowable maximum value of the signal power of the $i^{th}$ user, and $\underline{P}_{Ui}$ is an allowable minimum value of the signal power of the $i^{th}$ user; and the seventh condition is $\underline{R}_i \le R_i \le \overline{R}_i$, in which $R_i$ is actual congestion of an $i^{th}$ node, $\overline{R}_i$, is an allowable maximum value of the congestion of the $i^{th}$ node, and $\underline{R}_i$ is an allowable minimum value of the congestion of the $i^{th}$ node.

To obtain the target control input, in some embodiments, the second calculation unit includes:

a seventh calculation module, arranged for obtaining training samples, an initial residual, the maximum number of iterations and an initial Lagrange multiplier, determining the number of samples according to the training samples, randomly generating an input weight and a bias value, and inputting the number of samples, the input weight, the initial residual and the initial Lagrange multiplier into a formula to calculate an output weight:

$$\beta_{k+1} = \left(H^T H + 2/R\mu I\right)^{-1} H^T\left(y - e_k + \lambda_k/\mu\right);$$

where $\beta_{k+1}$ is the output weight calculated by k iterations, H is an output matrix of a hidden layer, $H\beta=Y$, Y is an output matrix of the training samples, $\beta$ is the output weight between the hidden layer and an output layer, $e_k$ is a residual of the k iterations, R is a regular coefficient, $\lambda_k$ is the Lagrange multiplier in the k iterations, I is a unit matrix, $\mu$ is a penalty coefficient, and the penalty coefficient satisfies $\mu=2N/\|y\|_1$, where in cases where the training samples are $(x_i, y_i) \in R^n \times R^m$, H satisfies:

$$H(w_1 \ldots w_s, x_1 \ldots x_N, b_1 \ldots b_s) = \begin{bmatrix} g(w_1x_1+b_1) & \ldots & g(w_sx_1+b_s) \\ \vdots & \ldots & \vdots \\ g(w_1x_N+b_1) & \ldots & g(w_sx_N+b_s) \end{bmatrix};$$

where w is the input weight, b is the bias value, and $g(\bullet)$ is an activation function;

an eighth calculation module, arranged for updating the penalty coefficient according to the output weight, and training a model according to the output weight and the updated penalty coefficient:

$$\beta_{k+1} = \left(H^T H + 2/R\mu I\right)^{-1} H^T\left(y - e_k + \lambda_k/\mu\right);$$

$$\mu = 2N/\|y\|_1 e_{k+1} = shink\left(H\beta_{k+1} + \frac{\lambda_k}{\mu}, 1/\mu\right);$$

$$\text{and } \lambda_{k+1} = \lambda_k + \mu(y - H\beta_{k+1} - e_{k+1});$$

a ninth calculation module, arranged for, when the number of iterations reaches the maximum number, constructing an extreme learning machine model according to the output weight, the input weight and the bias value during the last iteration, and solving the target control input according to the extreme learning machine model.

The information identification-based power Internet of Things protection apparatus includes a processor and a memory. The determination unit, the first calculation unit, the construction unit, the second calculation unit, and the like are all stored in the memory as program units. And the processor executes the program units stored in the memory to implement corresponding functions. The modules are all located in the same processor; or the modules are located in different processors in any combination form.

The processor includes a kernel, and the kernel removes a corresponding program unit from the memory. The kernel may set at least one, and security protection of the power Internet of Things is improved by adjusting kernel parameters.

The memory includes a non-persistent memory, a random access memory (RAM), and/or a non-transitory memory in a computer-readable medium, for example, a read-only memory (ROM) or a flash RAM, and the memory includes at least one storage chip.

In some embodiments of the present disclosure, a non-transitory storage medium is further provided, where the non-transitory storage medium includes a program, and when the program runs, a device where the non-transitory storage medium is located is controlled to perform the information identification-based power Internet of Things protection method.

In some embodiments of the present disclosure, a processor is further provided, where the processor is arranged for running a program, and when the program runs, the information identification-based power Internet of Things protection method is executed.

In some embodiments of the present disclosure, a power Internet of Things system is further provided, where the power Internet of Things system includes a processor, a memory, and a program stored in the memory and executable on the processor, and when the processor executes the program, at least the step of the information identification-based power Internet of Things protection method is implemented.

In some embodiments of the present disclosure, a computer program product is further provided, and when executed on a data processing device, computer program product is adapted to execute a program initialized with at least the step of the information identification-based power Internet of Things protection method.

It should be apparent to those skilled person in the art that the various modules or steps of the present disclosure can be implemented by a general-purpose computing device, and the various modules or steps can be concentrated on a single computing device or distributed on a network composed of multiple computing devices, and the various modules or steps can be stored in a storage device for execution by the computing device, and in some cases, the steps shown or described can be performed in an order different from that described herein, or can be fabricated into individual integrated circuit modules, or multiple modules or steps in the integrated circuit modules can be fabricated into a single integrated circuit module. In this way, the present disclosure is not limited to any specific combination of hardware and software.

Those skilled person in the art should understand that the embodiments of present disclosure can be provided as a method, a system, or a computer program product. Therefore, the present disclosure may use a form of hardware embodiments, software embodiments, or embodiments with a combination of software and hardware. Moreover, the present disclosure may use a form of a computer program product implemented on at least one computer-usable storage media (including but not limited to a disk memory, a CD-ROM, an optical memory, and the like) including computer-usable program codes.

The present disclosure is described with reference to the flowcharts and/or block diagrams of the method, the device (system), and the computer program product according to the embodiments of present disclosure. It should be understood that computer program instructions can be used for implementing each process and/or block in the flowcharts and/or the block diagrams and a combination of a process and/or a block in the flowcharts and/or the block diagrams. These computer program instructions can be provided to a general-purpose computer, a special-purpose computer, an embedded processor, or a processor of another programmable data processing device to generate a machine, so that the instructions executed by the processor of the computer or other programmable data processing devices generate an apparatus for implementing the functions specified in at least one flow of the flowcharts and/or at least one block in the block diagrams.

These computer program instructions may also be stored in a computer-readable memory capable of guiding a computer or other programmable data processing devices to operate in a specific manner, so that the instructions stored in the computer-readable memory produce an article of manufacture including an instruction apparatus that implements the functions specified in at least one flow of the flowchart and/or at least one block of the block diagram.

These computer program instructions may also be loaded onto a computer or other programmable data processing device such that a series of operational steps are performed on the computer or other programmable device to produce a computer-implemented process, such that the instructions executed on the computer or other programmable device provide steps for implementing the functions specified in at least one flow of the flowchart and/or at least one block of the block diagram.

In one typical configuration, a computing device includes at least one processor (such as CPU), input/output interface, network interface, and memory.

The memory may include a non-persistent memory, a random access memory (RAM), and/or a non-transitory memory in a computer-readable medium, for example, a read-only memory (ROM) or a flash RAM. The memory is an example of a computer-readable medium.

The computer-readable medium includes persistent, non-persistent, movable, and non-removable media that can store information by using any method or technology. The information can be a computer-readable instruction, a data structure, a program module, or other data. Examples of computer storage media include, but are not limited to, phase-change random access memory (PRAM), static random access memory (SRAM), dynamic random access memory (DRAM), other types of random access memory (RAM), read only memory (ROM), electrically erasable programmable read only memory (EEPROM), flash memory or other memory technology, read only optical disk read only memory (CD-ROM), digital versatile disk (DVD), or other optical storage, magnetic cassettes, magnetic tape, magnetic disk storage or other magnetic storage devices, or any other non-transmission medium, can be used for storing information that can be accessed by a computing device. As defined herein, the computer-readable medium does not include transitory media, such as a modulated data signal and a carrier.

It should also be noted that the terms “comprising”, “including” or any other variation thereof are intended to cover a non-exclusive inclusion, so that a process, method, commodity, or device that includes a series of elements includes not only those elements, but also other elements that are not explicitly listed, or elements inherent to such a process, method, commodity, or device. In the absence of more restrictions, the statement” includes one. There are no additional identical elements in the process, method, product, or device that includes the element.

From the above description, it can be seen that the above embodiments of the present disclosure achieve the following technical effects.

In the information identification-based power Internet of Things protection method, the security identification is performed on a data source of power Internet of Things to determine the security identification error of the data source, the security identification is performed on the data channel of the power Internet of Things to determine the security identification error of the data channel, and the security identification is performed on the data storage of the power Internet of Things to determine the security identification error of the data storage; the multiple fuzzy-uncertainty three-dimensional trapezoidal fuzzy sets with different levels of data transmission rates is calculated by using the statistical analysis method according to the data transmission rates of the monitoring data center of the power Internet of Things, the multiple fuzzy-uncertainty three-dimensional trapezoidal fuzzy sets with different levels of data storage sharing scales is calculated by using the statistical analysis method according to the data storage sharing scales of the data monitoring center of the power Internet of Things, the information gain value is calculated according to the multiple three-dimensional trapezoidal fuzzy sets with different levels of data transmission rates and the multiple the three-dimensional trapezoidal fuzzy sets with different levels of data storage sharing scales, the information loss value is calculated according to the security identification error of the data source, the security identification error of the data channel, and the security identification error of the data storage, and the trust degree is calculated according to the information gain value and the information loss value; the objective function is constructed according to the trust degree, where the objective function is used for solving to obtain the control input in response to obtaining the minimum value of the security identification error of the data source, the minimum value of the security identification error of the data channel, and the minimum value of the security identification error of the data storage, and obtaining a maximum value of the trust degree; and the objective function is solved according to the extreme learning machine method to obtain the target control input, and the power Internet of Things system is controlled according to the target control input. In some embodiments of the present disclosure the statistical analysis method is adopted to determine a data information identification error of a source network, a place name, a user and a node of the power Internet of Things, a data information identification error of a channel network, a place name, a user and a node of the power Internet of Things, and a data information identification error of a storage network, a place name, a user and a node of the power Internet of Things. The method can solve the problem in the related art that the information identification-based power Internet of Things security protection method has not been provided yet through constructing the extreme learning machine model to solve the objective function to obtain the target control input, and the objective function is set with the error minimization of the source network, the channel network and the storage network, and the trust degree maximization of a power Internet of Things user in the power Internet of Things system.

In the information identification-based power Internet of Things protection apparatus, the determining unit performs security identification on the data source of power Internet of Things to determine the security identification error of the data source, performs security identification on the data channel of the power Internet of Things to determine the security identification error of the data channel, and performs security identification on data storage of the power Internet of Things to determine a security identification error of the data storage; the first calculating unit calculates multiple fuzzy-uncertainty three-dimensional trapezoidal fuzzy sets with different levels of data transmission rates by using a statistical analysis method according to the data transmission rates of a monitoring data center of the power Internet of Things, calculates multiple fuzzy-uncertainty three-dimensional trapezoidal fuzzy sets with different levels of data storage sharing scales by using the statistical analysis method according to the data storage sharing scales of the data monitoring center of the power Internet of Things, calculates the information gain value according to the multiple three-dimensional trapezoidal fuzzy sets with different levels of data transmission rates and the multiple the three-dimensional trapezoidal fuzzy sets with different levels of data storage sharing scales, calculates the information loss value according to the security identification error of the data source, the security identification error of the data channel, and the security identification error of the data storage, and calculates the trust degree according to the information gain value and the information loss value; the constructing unit constructs the objective function according to the trust degree, where the objective function is used for solving to obtain the control input in response to obtaining the minimum value of the security identification error of the data source, the minimum value of the security identification error of the data channel, and the minimum value of the security identification error of the data storage, and obtaining the maximum value of the trust degree; and the second calculation unit solves the objective function according to the extreme learning machine method to obtain the target control input, and controls the power Internet of Things system according to the target control input. In some embodiments of the present disclosure the statistical analysis method is adopted to determine a data information identification error of a source network, a place name, a user and a node of the power Internet of Things, a data information identification error of a channel network, a place name, a user and a node of the power Internet of Things, and a data information identification error of a storage network, a place name, a user and a node of the power Internet of Things. The method can solve the problem in the related art that the information identification-based power Internet of Things security protection method has not been provided yet through constructing the extreme learning machine model to solve the objective function to obtain the target control input, and the objective function is set with the error minimization of the source network, the channel network and the storage network, and the trust degree maximization of a power Internet of Things user in the power Internet of Things system.

The descriptions are exemplary embodiments of present disclosure and are not intended to limit present disclosure, and for those skilled person in the art, the present disclosure may have various changes and changes. Any modification, equivalent replacement, or improvement made within the spirit and principle of present disclosure shall fall within the protection scope of present disclosure.

What is claimed is:

1. An information identification-based power Internet of Things protection method, comprising:

performing security identification on a data source of power Internet of Things to determine a security identification error of the data source, performing security identification on a data channel of the power Internet of Things to determine a security identification error of the data channel, and performing security identification on data storage of the power Internet of Things to determine a security identification error of the data storage;

calculating a plurality of fuzzy-uncertainty three-dimensional trapezoidal fuzzy sets with different levels of data transmission rates by using a statistical analysis method according to the data transmission rates of a monitoring data center of the power Internet of Things, calculating a plurality of fuzzy-uncertainty three-dimensional trapezoidal fuzzy sets with different levels of data storage sharing scales by using the statistical analysis method according to the data storage sharing scales of the data monitoring center of the power Internet of Things, calculating an information gain value according to the plurality of three-dimensional trapezoidal fuzzy sets with different levels of data transmission rates and the plurality of the three-dimensional trapezoidal fuzzy sets with different levels of data storage sharing scales, calculating an information loss value according to the security identification error of the data source, the security identification error of the data channel, and the security identification error of the data storage, and calculating a trust degree according to the information gain value and the information loss value;

constructing an objective function according to the trust degree, wherein the objective function is used for solving to obtain a control input in response to obtaining a minimum value of the security identification error of the data source, a minimum value of the security identification error of the data channel, and a minimum value of the security identification error of the data storage, and obtaining a maximum value of the trust degree; and solving the objective function according to an extreme learning machine method to obtain a target control input, and controlling a power Internet of Things system according to the target control input.

2. The method as claimed in claim 1, wherein performing security identification on the data source of the power Internet of Things to determine the security identification error of the data source comprises:

collecting a data source network of the power Internet of Things and location data information of the data source network, user data information of the data source network and node data information of the data source network by using an Internet of Things sensing system, and determining a data information identification error of the data source network, a data information identification error of the location data information of the data source network, a data information identification error of the user data information of the data source network and a data information identification error of the node data information of the data source network respectively by using the statistical analysis method; and calculating the security identification error of the data source according to the data information identification error of the data source network, the data information identification error of the location data information of the data source network, the data information identification error of the user data information of the data source network and the data information identification error of the node data information of the data source network:

$$e_F = e_G^F + e_P^F + e_U^F + e_N^F;$$

wherein $e_F$ is the security identification error of the data source, $$e_G^F$$

is the data information identification error of the data source network, $$e_P^F$$

is the data information identification error of the location data information of the data source network, $$e_U^F$$

is the data information identification error of the user data information of the data source network, and $$e_N^F$$

is the data information identification error of the node data information of the data source network.

3. The method as claimed in claim 1, wherein performing security identification on the data channel of the power Internet of Things to determine the security identification error of the data channel comprises:

collecting a data channel network of the power Internet of Things and location data information of the data channel network, user data information of the data channel network and node data information of the data channel network by using the Internet of Things sensing system, and determining a data information identification error of the data channel network, a data information identification error of the location data information of the data channel network, a data information identification error of the user data information of the data channel network and a data information identification error of the node data information of the data channel network respectively by using the statistical analysis method; and calculating the security identification error of the data channel according to the data information identification error of the data channel network, the data information identification error of the location data information of the data channel network, the data information identification error of the user data information of the data channel network and the data information identification error of the node data information of the data channel network:

$$e_X = e_G^X + e_P^X + e_U^X + e_N^X;$$

wherein $e_X$ is the security identification error of the data channel, $$e_G^X$$

is the data information identification error of the data channel network, $$e_P^X$$

is the data information identification error of the location data information of the data channel network, $$e_U^X$$

is the data information identification error of the user data information of the data channel network, and $$e_N^X$$

is the data information identification error of the node data information of the data channel network.

4. The method as claimed in claim 1, wherein performing security identification on the data storage of the power Internet of Things to determine the security identification error of the data storage comprises:

collecting a data storage network of the power Internet of Things and location data information of the data storage network, user data information of the data storage network and node data information of the data storage network by using the Internet of Things sensing system, and determining a data information identification error of the data storage network, a data information identification error of the location data information of the data storage network, a data information identification error of the user data information of the data storage network and a data information identification error of the node data information of the data storage network respectively by using the statistical analysis method; and calculating the security identification error of the data storage according to the data information identification error of the data storage network, the data information identification error of the location data information of the data storage network, the data information identification error of the user data information of the data storage network and the data information identification error of the node data information of the data storage network:

$$e_S = e_G^S + e_P^S + e_U^S + e_N^S;$$

wherein $e_S$ is the security identification error of the data storage, $$e_G^S$$

is the data information identification error of the data storage network, $$e_P^S$$

is the data information identification error of the location data information of the data storage network, $$e_U^S$$

is the data information identification error of the user data information of the data storage network, and $$e_N^S$$

is the data information identification error of the node data information of the data storage network.

5. The method as claimed in claim 1, wherein calculating the information gain value according to the plurality of three-dimensional trapezoidal fuzzy sets with different levels of data transmission rates and the plurality of the three-dimensional trapezoidal fuzzy sets with different levels of data storage sharing scales, and calculating the information loss value according to the security identification error of the data source, the security identification error of the data channel, and the security identification error of the data storage, and calculating the trust degree according to the information gain value and the information loss value, comprise:

substituting the plurality of three-dimensional trapezoidal fuzzy sets with different levels of data transmission rates and the plurality of three-dimensional trapezoidal fuzzy sets with different levels of data storage sharing scales into a calculation formula of the information gain value to calculate the information gain value R corresponding to the plurality of three-dimensional trapezoidal fuzzy sets with different levels of data transmission rates and the plurality of three-dimensional trapezoidal fuzzy sets with different levels of data storage sharing scales:

$$R = E\left[\vee_{i=1}^{9} k_{Dvi} v_{Di} \otimes \vee_{i=1}^{9} k_{DSi} S_{Di} \otimes k_{Mi} M_H\right];$$

wherein R is an information gain value formed by the power Internet of Things providing data collection, transmission, storage and sharing for an accessing user, $$\vee_{i=1}^{9} k_{Dvi} v_{Di}$$

is an information gain value in cases where the fuzzy-uncertainty three-dimensional trapezoidal fuzzy sets of the data transmission rates are at different levels when the power Internet of Things provides a service to the accessing user, $k_{Dvi}$ is a unit gain value in cases where the power Internet of Things provides a fuzzy-uncertainty three-dimensional trapezoidal fuzzy set of an $i^{th}$ data transmission rate, $$\vee_{i=1}^{9} k_{DSi} S_{Di}$$

is an information gain value in cases where the fuzzy-uncertainty three-dimensional trapezoidal fuzzy sets of the data storage scales are at different levels when the power Internet of Things provides the service to the accessing user, $k_{DSi}$ is a unit gain value in cases where the power Internet of Things provides a fuzzy-uncertainty three-dimensional trapezoidal fuzzy set of an $i^{th}$ data storage sharing scale, $k_{Mi}M_H$ is an information gain value when the power Internet of Things provides a data collection service for the accessing user at a sensing layer, $k_{Mi}$ is a unit gain value when the power Internet of Things provides the data collection service for the accessing user at the sensing layer, E[ ] is to obtain a desired value for [ ], and $$\vee_{i=1}^{9}$$

represents a union set of nine fuzzy sets;

substituting the security identification error of the data source, the security identification error of the data channel and the security identification error of the data storage into a calculation formula of the information loss value to calculate the information loss value L of the security identification error of the data source, the security identification error of the data channel and the security identification error of the data storage:

$$L = k_1^F k_2^F e_F + k_1^X k_2^X e_X + k_1^S k_2^S e_S;$$

wherein L is an information loss value of market trading caused by the security identification error of the data source, the security identification error of the data channel and the security identification error of the data storage formed in the power Internet of Things;

$$k_1^F$$

is an influence coefficient or weight coefficient of the security identification error of the data source on power data distribution, $$k_2^F$$

is a unit power information loss value caused by the security identification error of the data source;

$$k_1^X$$

is an influence coefficient or weight coefficient of the security identification error of the data channel on the power data distribution, $$k_2^X$$

is a unit power information loss value caused by the security identification error of the data channel;

$$k_1^S$$

is an influence coefficient or weight coefficient of the security identification error of the data storage on the power data distribution, $$k_2^S$$

is a unit power information loss value caused by the security identification error of the data storage; and substituting the information gain value and the information loss value into a calculation formula of the trust degree to calculate the trust degree B:

$$B = \frac{R}{R+L}.$$

6. The method as claimed in claim 1, wherein constructing the objective function according to the trust degree comprises:

constructing the objective function according to the trust degree, wherein the objective function satisfies a first condition, a second condition, a third condition, a fourth condition, a fifth condition, a sixth condition, a seventh condition, and an eighth condition:

$$\max B;$$

$$\min(e_F + e_X + e_S);$$

wherein the first condition is $\underline{V}_{Vi} \le V_{Vi} \le \overline{V}_{Vi}$, in which $V_{Vi}$ is an actual signal traffic of an $i^{th}$ user, $\overline{V}_{Vi}$ is an allowable maximum value of the signal traffic of the $i^{th}$ user, and $\underline{V}_{Vi}$ is an allowable minimum value of the signal traffic of the $i^{th}$ user; the second condition is $\underline{V}_{Vi} \le V_{Vi}$, in which $v_{Vi}$ is an actual signal transmission speed of the $i^{th}$ user, and $\underline{v}_{Vi}$ is an allowable minimum value of the signal transmission speed of the $i^{th}$ user; the third condition is $\underline{v}_{Xi} \le v_{Xi} \le \overline{v}_{Xi}$, in which $v_{Xi}$ is an actual transmission speed of an $i^{th}$ channel, $\overline{v}_{Xi}$ is an allowable maximum value of the transmission speed of the $i^{th}$ channel, and $\underline{v}_{Xi}$ is an allowable minimum value of the transmission speed of the $i^{th}$ channel; the fourth condition is $\underline{k}_{QoS} \le k_{QoS} \le \overline{k}_{QoS}$, in which $k_{QoS}$ is an actual network quality of service, $\overline{k}_{QoS}$ is an allowable maximum value of the network quality of service, and $\underline{k}_{QoS}$ is an allowable minimum value of the network quality of service; the fifth condition is $\underline{t}_{Xi} \le t_{Xi} \le \overline{t}_{Xi}$, in which $t_{Xi}$ is an actual signal transmission delay of the $i^{th}$ channel, $\overline{t}_{Xi}$ is an allowable maximum value of the signal transmission delay of the $i^{th}$ channel, and $\underline{t}_{Xi}$ is an allowable minimum value of the signal transmission delay of the $i^{th}$ channel; the sixth condition is $\underline{P}_{Ui} \le P_{Ui} \le \overline{P}_{Ui}$, in which $P_{Ui}$ is an actual signal power of the $i^{th}$ user, $\overline{P}_{Ui}$ is an allowable maximum value of the signal power of the $i^{th}$ user, and $\underline{P}_{Ui}$ is an allowable minimum value of the signal power of the $i^{th}$ user; and the seventh condition is $\underline{R}_i \le R_i \le \overline{R}_i$, in which $R_i$ is actual congestion of an $i^{th}$ node, $\overline{R}_i$ is an allowable maximum value of the congestion of the $i^{th}$ node, and $\underline{R}_i$ is an allowable minimum value of the congestion of the $i^{th}$ node.

7. The method as claimed in claim 1, wherein solving the objective function according to the extreme learning machine method to obtain the target control input comprises:

obtaining training samples, an initial residual, the maximum number of iterations and an initial Lagrange multiplier, determining the number of samples according to the training samples, randomly generating an input weight and a bias value, and inputting the number of samples, the input weight, the initial residual and the initial Lagrange multiplier into a formula to calculate an output weight:

$$\beta_{k+1} = \left(H^T H + 2/R\mu I\right)^{-1} H^T\left(y - e_k + \lambda_k/\mu\right);$$

wherein $\beta_{k+1}$ is the output weight calculated by k iterations, H is an output matrix of a hidden layer, $H\beta=Y$, Y is an output matrix of the training samples, $\beta$ is the output weight between the hidden layer and an output layer, $e_k$ is a residual of the k iterations, R is a regular coefficient, $\lambda_k$ is the Lagrange multiplier in the k iterations, I is a unit matrix, $\mu$ is a penalty coefficient, and the penalty coefficient satisfies $\mu=2N/\|y\|_1$, wherein in cases where the training samples are $(x_i, y_i) \in R^n \times R^m$, H satisfies:

$$H(w_1 \ldots w_s, x_1 \ldots x_N, b_1 \ldots b_s) = \begin{bmatrix} g(w_1 x_1 + b_1) & \ldots & g(w_s x_1 + b_s) \\ \vdots & \ldots & \vdots \\ g(w_1 x_N + b_1) & \ldots & g(w_s x_N + b_s) \end{bmatrix};$$

wherein w is the input weight, b is the bias value, and g(•) is an activation function;

updating the penalty coefficient according to the output weight, and training a model according to the output weight and the updated penalty coefficient:

$$\beta_{k+1} = \left(H^T H + 2/R\mu I\right)^{-1} H^T \left(y - e_k + \lambda_k/\mu\right);$$

$$\mu = 2N/\|y\|_1 \; e_{k+1} = shink\left(H\beta_{k+1} + \frac{\lambda_k}{\mu}, 1/\mu\right);$$

$$\text{and } \lambda_{k+1} = \lambda_k + \mu(y - H\beta_{k+1} - e_{k+1});$$

when the number of iterations reaches the maximum number, constructing an extreme learning machine model according to the output weight, the input weight and the bias value during the last iteration, and solving the target control input according to the extreme learning machine model.

8. A non-transitory storage medium, wherein the non-transitory storage medium comprises a program, when the program runs, a device where the non-transitory storage medium is located is controlled to execute the following steps:

performing security identification on a data source of power Internet of Things to determine a security identification error of the data source, performing security identification on a data channel of the power Internet of Things to determine a security identification error of the data channel, and performing security identification on data storage of the power Internet of Things to determine a security identification error of the data storage;

calculating a plurality of fuzzy-uncertainty three-dimensional trapezoidal fuzzy sets with different levels of data transmission rates by using a statistical analysis method according to the data transmission rates of a monitoring data center of the power Internet of Things, calculating a plurality of fuzzy-uncertainty three-dimensional trapezoidal fuzzy sets with different levels of data storage sharing scales by using the statistical analysis method according to the data storage sharing scales of the data monitoring center of the power Internet of Things, calculating an information gain value according to the plurality of three-dimensional trapezoidal fuzzy sets with different levels of data transmission rates and the plurality of the three-dimensional trapezoidal fuzzy sets with different levels of data storage sharing scales, calculating an information loss value according to the security identification error of the data source, the security identification error of the data channel, and the security identification error of the data storage, and calculating a trust degree according to the information gain value and the information loss value;

constructing an objective function according to the trust degree, wherein the objective function is used for solving to obtain a control input in response to obtaining a minimum value of the security identification error of the data source, a minimum value of the security identification error of the data channel, and a minimum value of the security identification error of the data storage, and obtaining a maximum value of the trust degree; and solving the objective function according to an extreme learning machine method to obtain a target control input, and controlling a power Internet of Things system according to the target control input.

9. A power Internet of Things system, comprising: at least one processor, a memory and at least one program, wherein the at least one program is stored in the memory and arranged for being executed by the at least one processor, and the at least one program is used for executing the following steps:

performing security identification on a data source of power Internet of Things to determine a security identification error of the data source, performing security identification on a data channel of the power Internet of Things to determine a security identification error of the data channel, and performing security identification on data storage of the power Internet of Things to determine a security identification error of the data storage;

calculating a plurality of fuzzy-uncertainty three-dimensional trapezoidal fuzzy sets with different levels of data transmission rates by using a statistical analysis method according to the data transmission rates of a monitoring data center of the power Internet of Things, calculating a plurality of fuzzy-uncertainty three-dimensional trapezoidal fuzzy sets with different levels of data storage sharing scales by using the statistical analysis method according to the data storage sharing scales of the data monitoring center of the power Internet of Things, calculating an information gain value according to the plurality of three-dimensional trapezoidal fuzzy sets with different levels of data transmission rates and the plurality of the three-dimensional trapezoidal fuzzy sets with different levels of data storage sharing scales, calculating an information loss value according to the security identification error of the data source, the security identification error of the data channel, and the security identification error of the data storage, and calculating a trust degree according to the information gain value and the information loss value;

constructing an objective function according to the trust degree, wherein the objective function is used for solving to obtain a control input in response to obtaining a minimum value of the security identification error of the data source, a minimum value of the security identification error of the data channel, and a minimum value of the security identification error of the data storage, and obtaining a maximum value of the trust degree; and solving the objective function according to an extreme learning machine method to obtain a target control input, and controlling a power Internet of Things system according to the target control input.

* * * * *